(12) United States Patent
Sugiyama et al.

(10) Patent No.: US 6,490,522 B2
(45) Date of Patent: Dec. 3, 2002

(54) ROUTE GUIDANCE GENERATION APPARATUS AND METHOD

(75) Inventors: Hiroshi Sugiyama, Kanagawa-ken (JP); Miwako Doi, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/057,925

(22) Filed: Jan. 29, 2002

(65) Prior Publication Data

US 2002/0103599 A1 Aug. 1, 2002

(30) Foreign Application Priority Data

Jan. 30, 2001 (JP) ....................................... 2001-022166

(51) Int. Cl.$^7$ ................................................ G01C 2/00
(52) U.S. Cl. ......................... 701/211; 701/208; 701/201
(58) Field of Search ................................ 701/200, 201, 701/207, 208, 209, 206, 210, 211, 213, 23, 24, 25; 340/989, 991, 993, 990, 995, 996; 342/456, 457, 450, 451, 357.1, 357.06

(56) References Cited

U.S. PATENT DOCUMENTS

| | | | | |
|---|---|---|---|---|
| 5,948,040 A | * | 9/1999 | Delorme et al. ............ | 701/201 |
| 6,055,478 A | * | 4/2000 | Heron ......................... | 701/213 |
| 6,064,947 A | * | 5/2000 | Johnson et al. ............. | 701/213 |
| 6,128,571 A | * | 10/2000 | Ito et al. ...................... | 701/201 |
| 6,182,010 B1 | * | 1/2001 | Berstis ........................ | 701/211 |
| 6,339,746 B1 | | 1/2002 | Sugiyama et al. | |

OTHER PUBLICATIONS

Copy of U.S. Patent Application Ser. No. 09/716,303 filed Nov. 21, 2000, to Hawagawa et al.
Sugiyama et al.; "A Pedestrian Navigation System Based On A Navigation Demand Model"; 8$^{th}$ ITS World Congress, pp. 1–8, (2001).

\* cited by examiner

Primary Examiner—Richard M. Camby
(74) Attorney, Agent, or Firm—Finnegan, Henderson, Farabow, Garrett & Dunner, L.L.P.

(57) ABSTRACT

An input unit indicates a departure point and a destination point on map information. A calculation unit extracts a plurality of routes each connected from the departure point to the destination point from the map information, and calculates a guidance demand degree of arbitrary points along each of the plurality of routes. A guidance demand degree is an evaluation value of the point based on a linearity of route, a complexity of route junction, and a change of route width. A route selection unit selects one route from the plurality of routes based on the guidance demand degree of each route. A guidance generation unit generates guidance information of the point decided to guide based on the guidance demand degree along the one route. A presentation unit presents the guidance information to a user.

20 Claims, 24 Drawing Sheets

THICK ⟶ THICK

THICK ⟶ THIN

THIN ⟶ THICK

SIMPLE CHANGE
OF ROUTE WIDTH

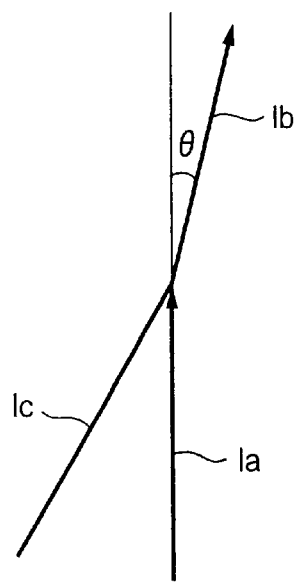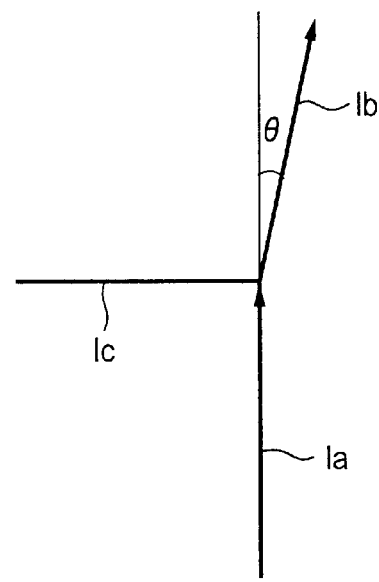
LOW COMPLEXITY DEGREE
FIG.8A
HIGH COMPLEXITY DEGREE
FIG.8B

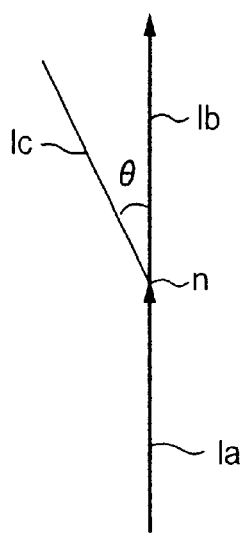 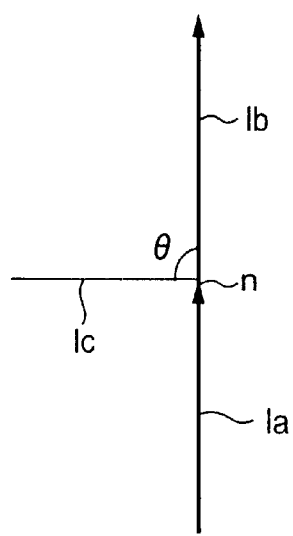 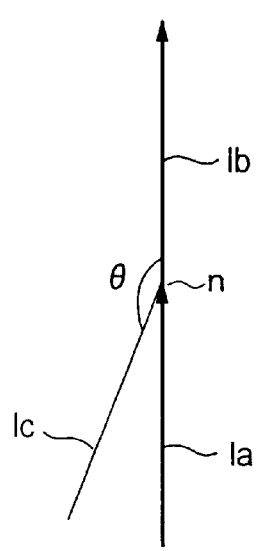
FIG.9A  FIG.9B  FIG.9C
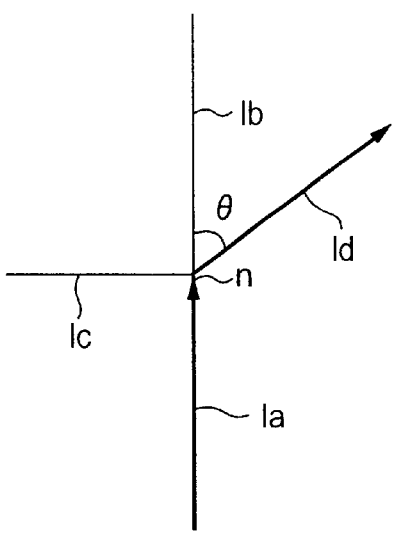 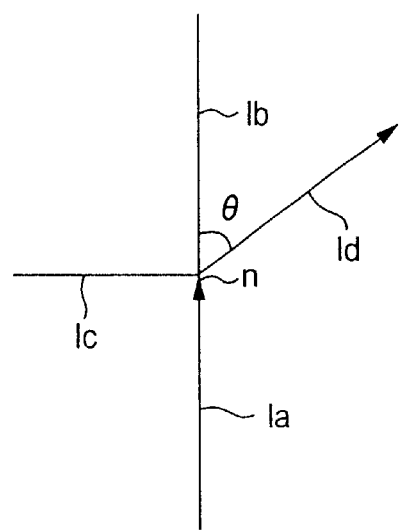
FIG.10A  FIG.10B

```
GO FORWARD TO C DEPARTMENT LOCATED 50 METERS
AHEAD.
GO STRAIGHT ON JUNCTION BEYOND C DEPARTMENT.
GO FORWARD TO A JUNCTION LOCATED 200 METERS AHEAD.
TURN TO THE RIGHT AT A JUNCTION.
A PLACE LOCATED 100 METERS AHEAD IS THE DESTINATION.
```

GO FORWARD TO C DEPARTMENT LOCATED 50 METERS AHEAD.
GO STRAIGHT ON JUNCTION BEYOND C DEPARTMENT.
GO FORWARD TO A JUNCTION LOCATED 200 METERS AHEAD.

TURN TO THE RIGHT AT A JUNCTION.
A PLACE LOCATED 100 METERS AHEAD IS THE DESTINATION .

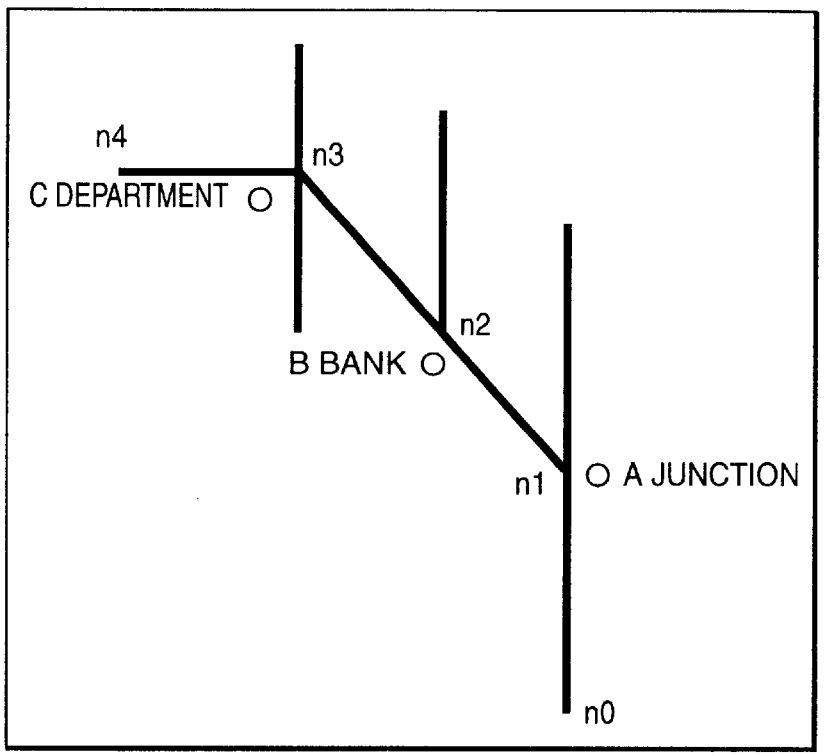

FIG.16A

GO FORWARD TO A JUNCTION LOCATED 100 METERS AHEAD.
TURN TO THE LEFT AT A JUNCTION.
GO STRAIGHT AT B BANK.
GO STRAIGHT ON JUNCTION OF C DEPARTMENT.
A PLACE LOCATED 50 METERS AHEAD IS THE DESTINATION.

FIG.16B

GO FORWARD TO C DEPARTMENT LOCATED 50 METERS AHEAD.
GO STRAIGHT ON JUNCTION OF C DEPARTMENT.
GO FORWARD TO A JUNCTION LOCATED 200 METERS AHEAD.
TURN TO THE RIGHT AT A JUNCTION.
A PLACE LOCATED 100 METERS AHEAD IS THE DESTINATION .

FIG.16C

AS FOR TOUR INDICATED DESTINATION,
A ROUTE TO THE DESTINATION DOES NOT
INCLUDE SUITABLE LANDMARKS AND IT IS
POSSIBLE TO LOSE YOUR WAY.
ACCORDINGLY, ROUTE GUIDANCE CAN NOT BE
PRESENTED.
I AM VERY SORRY, BUT PLEASE REFER DETAILED
MAP.

1. RETURN TO MAIN MENU.

2. COMPLETION

3. DETAILED MAP

FIG.19

| CORRECTION NODE | IN-NODE | OUT-NODE | CORRECTION ELEMENT | STRENGTH AND WEAKNESS | CORRECTION CONTENTS |
|---|---|---|---|---|---|
| n2 | n3 | n1 | COMPLEXITY DEGREE | STRENGTH | BE A GUIDANCE DEMAND NODE |
| n18 | n10 | n58 | CHANGE DEGREE OF ROUTE WIDTH | STRENGTH | ADD ROUTE WIDTH INFORMATION TO THE GUIDANCE |
| n345 | n87 | n350 | LINEARITY DEGREE | WEAKNESS | BE A GUIDANCE NEEDLESS NODE |
| | | | | | |

FIG.24

ROUTE GUIDANCE GENERATION APPARATUS AND METHOD

CROSS-REFERENCE TO RELATED APPLICATIONS

This application is based upon and claims the benefit of priority from the prior Japanese Patent Application PH 2001-022166, filed on Jan. 30, 2001; the entire contents of which are incorporated herein by reference.

FIELD OF THE INVENTION

The present invention relates to a route guidance generation apparatus and a method for generating route guidance for a pedestrian based on map information.

BACKGROUND OF THE INVENTION

As a route guidance system of prior art, car navigation systems are widely used. Recently, by minituarization of GPS (Global Positioning System), a route guidance system using a portable terminal for a pedestrian is also used. In these systems, the present location of the pedestrian is measured using GPS or cellular phone, and a point and a route of the pedestrian are drawn on a map neighboring the pedestrian's present location in order to execute the route guidance. Furthermore, an Internet service for route guidance for a cellular phone is used. In this case, the route guidance is presented by a sentence on a small-sized display of the cellular phone instead of the map.

In these route guidance systems, calculation of route is based on a method of Dijkstra well known as an algorithm to solve the shortest route. In this method, a route of minimum cost is calculated according to some evaluation standard. For example, the route of minimum cost of evaluation equation is calculated based on the evaluation standard in which a route length is short and a route width is wide (A wide road or a major street, for example). It is important that the route used for the guidance is short if possible and for the pedestrian not to lose his way. In the above-mentioned evaluation standard, "the route width is wide" represents a feature for the pedestrian not to lose his way.

However, even if a shape of junction point and a route width are complicated on the route, if the route includes sufficient landmarks, the pedestrian should not lose his way. Conversely, even if the route is simple, if a suitable landmark does not exist at a point of course change on the route such as an intersection, the pedestrian often loses his way. In short, in the route including necessary information for guidance at a point to be guided, it is initially important that the short route is calculated if possible. However, the route calculation in the prior system is insufficient for this aspect.

In a car navigation system including a portable terminal for the pedestrian, a predetermined base map is displayed in order along the route. In recent car navigation systems, navigation is often executed using speech synthesis. When a pedestrian reaches a junction point to change his way, these systems present the direction. Otherwise, the remaining distance to the next point to change his way is presented at a predetermined time or distance. This system is also insufficient from the aspect not to lose his way. The system is desirably controlled so that a detailed guidance is often presented at a point to be guided and a rough guidance is presented or not presented at a point not to be guided.

In another route guidance system, a method for displaying a simplified map or a guidance sentence is utilized. Especially, in a system automatically generating guidance, a size of the simplified map is changed based on type of a client's terminal, or a text of the guidance is displayed for a terminal having a screen too small to display the map image. In this way, the route guidance is executed with a merit of automatic generation.

In case of generating a simplified map of small size, many landmarks cannot be drawn. In order for the pedestrian to understand, the route guidance had better be simple. From above-mentioned two aspects, it is necessary that information such as the route and the landmark appear in the guidance lessen if possible. From the original purpose of the route guidance, it is necessary for a suitable route guidance system to generate the route guidance satisfying minimum information not to get lost. However, the route guidance of the prior art is generated by uniform processing without evaluating which point is easy for the pedestrian to lose his way by what degree.

Ordinarily, it is important for the route guidance system to guide a route of the shortest distance without the pedestrian's uneasiness to lose his way if possible. However, the route guidance system of the prior art makes much of the shortest distance route and makes light of the most important point not to get lost. Accordingly, the calculated route is not always the best route. Furthermore, in the generated guidance, the important aspect where a place easy to lose his way is, i.e., where a place to be sufficiently guided is, is not taken into consideration. Only a standardized guidance is generated.

BRIEF SUMMARY OF THE INVENTION

It is an object of the present invention to provide a route guidance generation apparatus and method for effectively generating the route guidance along one route in order for the pedestrian not to lose his way.

According to an aspect of the present invention, there is provided a route guidance generation apparatus, comprising: an input unit configured to indicate a departure point and a destination point on map information; a calculation unit configured to extract a plurality of routes each connected from the departure point to the destination point from the map information, and to calculate a guidance demand degree of arbitrary points along each of the plurality of routes, the guidance demand degree being on evaluation value of the point based on a linearity of route, a complexity of route junction, and a change of route width; a route selection unit configured to select one route from the plurality of routes based on the guidance demand degree of each route; a guidance generation unit configured to generate guidance information of the point decided to guide based on the guidance demand degree along the one route; and a presentation unit configured to present the guidance information to a user.

Further in accordance with another aspect of the present invention, there is also provided a route guidance generation method, comprising: indicating a departure point and a destination point on map information; extracting a plurality of routes each connected from the departure point to the destination point from the map information; calculating a guidance demand degree of arbitrary points along each of the plurality of routes, the guidance demand degree being an evaluation value of the point based on a linearity of route, a complexity of route junction, and a change of route width; selecting one route from the plurality of routes based on the guidance demand degree of each route; generating guidance information of the point decided to guide based on the guidance demand degree along the one route; and presenting the guidance information to a user.

Further in accordance with another aspect of the present invention, there is also provided a computer program product, comprising: a computer readable program code embodied in said product for causing a computer to generate guidance information, said computer readable program code having: a first program code to indicate a departure point and a destination point on map information; a second program code to extract a plurality of routes each connected from the departure point to the destination point from the map information; a third program code to calculate guidance demand degree of arbitrary points along each of the plurality of routes, the guidance demand degree being an evaluation value of the point based on a linearity of route, a complexity of route junction, and a change of route width; a fourth program code to select one route from the plurality of routes based on the guidance demand degree of each route; a fifth program code to generate guidance information of the point decided to guide based on the guidance demand degree along the one route; and a sixth program code to present the guidance information to a user.

Further in accordance with another aspect of the present invention, there is also provided a server apparatus, comprising: a receiving unit configured to receive a route guidance request transmitted from a client terminal, the route guidance request including a departure point and a destination; a calculation unit configured to extract a plurality of routes each connected from the departure point to the destination point from map information, and to calculate a guidance demand degree of arbitrary points along each of the plurality of routes, the guidance demand degree being an evaluation value of the point based on a linearity of route, a complexity of route junction, and a change of route width; a route selection unit configured to select one route from the plurality of routes based on the guidance demand degree of each route; a guidance generation unit configured to generate guidance information of the point decided to guide based on the guidance demand degree along the one route; and a transmitting unit configured to transmit the guidance information to the client's terminal.

Further in accordance with another aspect of the present invention, there is also provided an apparatus for supporting editing map information used for generation of guidance information to guide a route from a departure point to a destination point comprising: an extraction unit configured to extract at least one point of which a guidance demand degree is above a threshold as an investigation needed point from a plurality of points each having a guidance demand degree calculated based on a linearity of route, a complexity of route junction, and a change of route width on the map information, and to extract investigation contents of the investigation needed point by referring to the map information neighboring the investigation needed point; and an output unit configured to output a list including the investigation needed point and the investigation contents.

Further in accordance with another aspect of the present invention, there is also provided a method for supporting editing of map information used for generation of guidance information to guide a route from a departure point to a destination point, comprising; extracting at least one point of which a guidance demand degree is above a threshold as an investigation needed point from a plurality of points each having a guidance demand degree calculated based on a linearity of route, a complexity of route junction, and a change of route width on the map information: extracting investigation contents of the investigation needed point by referring to the map information neighboring the investigation needed point; and outputting a list including the investigation needed point and the investigation contents.

Further in accordance with another aspect of the present invention, there is also provided a computer program product, comprising: a computer readable program code embodied in said product for causing a computer to support editing of map information used for generation of guidance information to guide a route from a departure point to a destination point, said computer readable program code having: a first program code to extract at least one point of which a guidance demand degree is above a threshold as an investigation needed point from a plurality of points each having a guidance demand degree calculated based on a linearity of route, a complexity of route junction, and a change of route width on the map information; a second program code to extract investigation contents of the investigation needed point by referring to the map information neighboring the investigation needed point; and a third program code to output a list including the investigation needed point and the investigation contents.

BRIEF DESCRIPTION OF THE DRAWINGS

FIGS. 8A and 8B are schematic diagrams of an example that evaluation standard of the linearity lowers based on degree of the complexity.

FIGS. 9A, 9B and 9C are schematic diagrams of an example that degree of the complexity affecting the guidance demand degree lowers based on continuous thick routes.

FIGS. 10A and 10B are schematic diagrams of an example that degree of the linearity affecting the guidance demand degree lowers if a route is wider than another route that crosses the route.

FIGS. 16A, 16B and 16C are schematic diagrams of an example that the route guidance is changed based on advance direction of the pedestrian.

FIG. 19 is a schematic diagram of a display on which a message representing that the route guidance is difficult is presented.

FIG. 24 is a schematic diagram of an example of log data of a node decided to correct the calculation element.

DETAILED DESCRIPTION OF THE INVENTION

Figure 1:
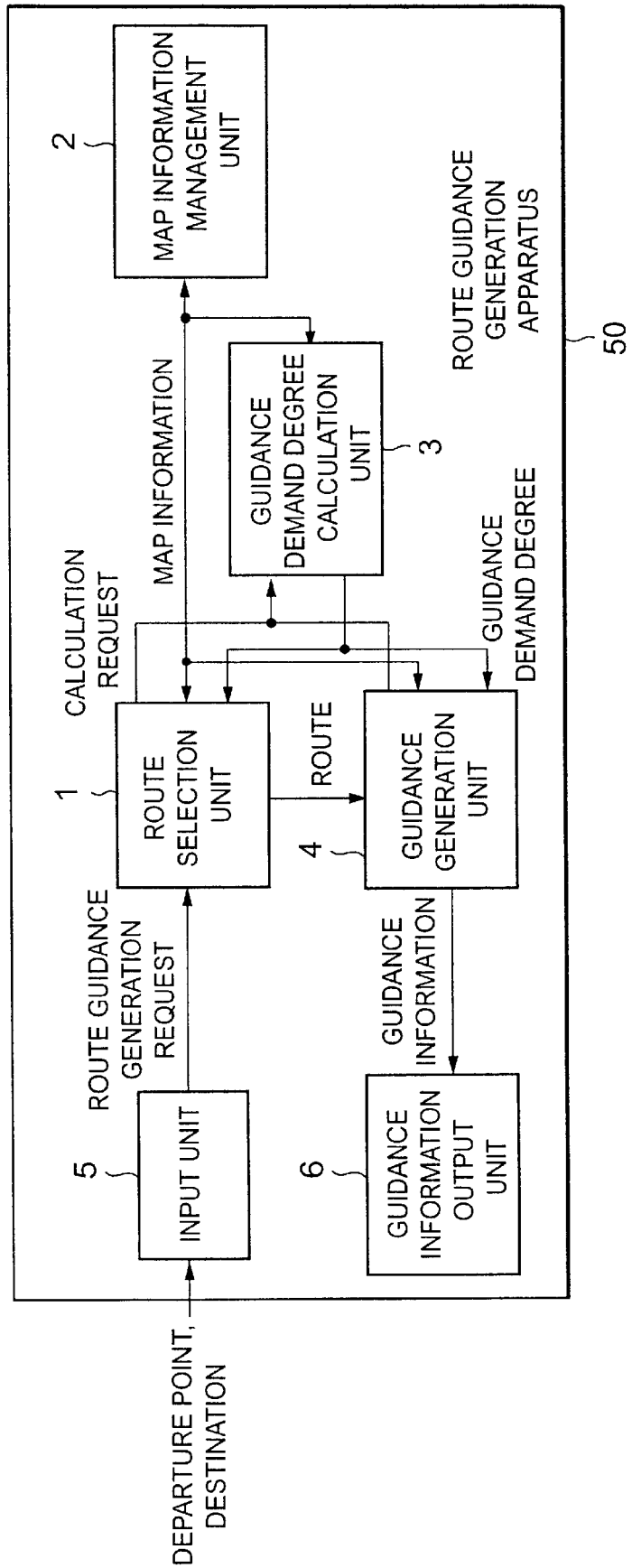
FIG. 1 is a block diagram of the route guidance generation apparatus according to a first embodiment of the present invention.

Hereinafter, various embodiments of the present invention will be explained by referring to the drawings.

FIG. 1 is a block diagram of a route guidance generation apparatus according to a first embodiment of the present invention. In FIG. 1, the route guidance generation apparatus includes a route selection unit 1, a map information management unit 2, a guidance demand degree calculation unit 3, a guidance generation unit 4, an input unit 5, and a guidance information output unit 6. A program describing processing steps of the above-mentioned functions may be executed in a computer in order to function as the route guidance generation apparatus.

In FIG. 1, the map information management unit 2 stores map information used for route guidance. The map information of predetermined area including the indicated point is retrieved through the map information management unit 2. The input unit 5 inputs the user's indication using various input device such as a keyboard or a ten key pad. When a departure point and a destination point are input from the user, the input unit 5 supplies a route guidance generation request including the departure point and the destination to the route selection unit 1. In response to the route guidance generation request, the route selection unit 1 searches a plurality of routes from the departure point to the destination by referring to the map information stored in the map information management unit 2, and selects a suitable route for the user not to lose his way. The guidance demand degree calculation unit 3 calculates a guidance demand degree of each key point along each searched route by referring to the map information stored in the map information management unit 2. The guidance demand degree is used to calculate the cost of each searched route, and the route selection unit 1 selects one suitable route. The guidance generation unit 4 generates guidance information to show the selected route by referring to the map information stored in the map information management unit 2. This generated guidance information is displayed on a predetermined screen or outputted as speech by the guidance information output unit 6.

Figure 2:
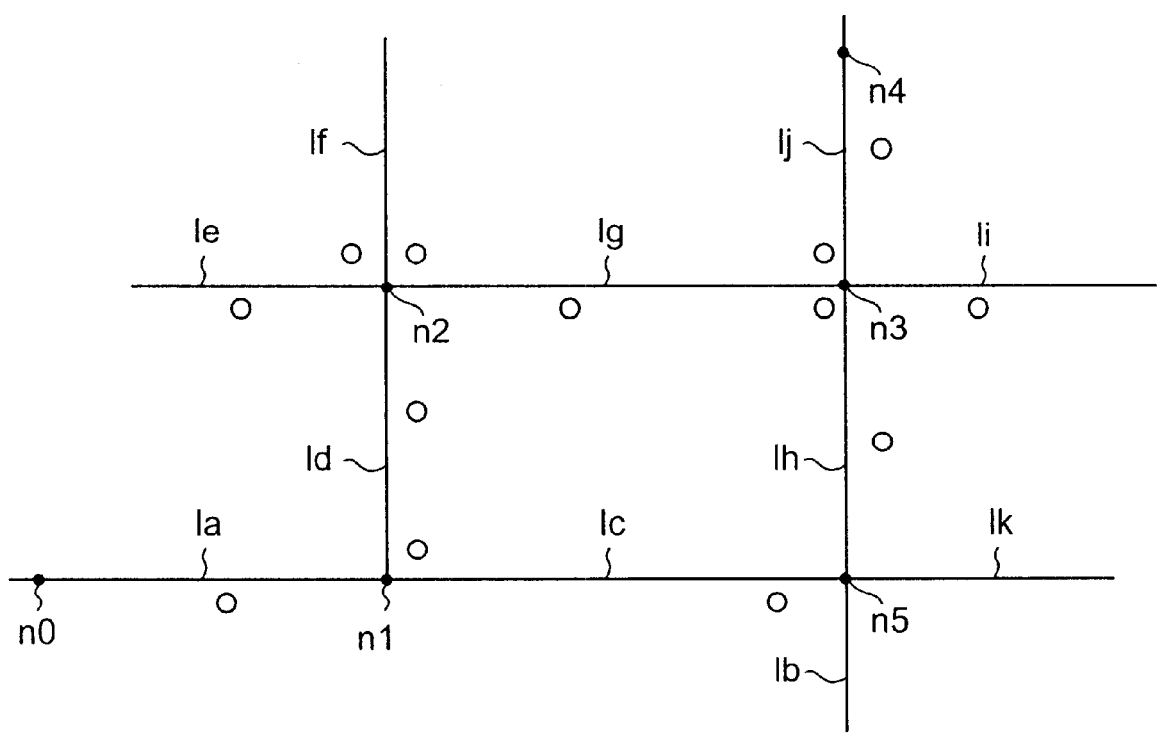
FIG. 2 is a schematic diagram of the map information.

The map information stored in the map information management unit 2 includes route network and landmark data. FIG. 2 is one example of the route network and the landmark data. The route network includes location information of a plurality of nodes each arbitrarily set on the route and connection information of each route line between two nodes, for example, from node n0 to node n1, from node n1 to node n2. Attribute data, such as connection relation, route type, route name, and route width, are assigned to each route line. The attribute data are stored in the map information management unit 2. In the following explanation, "n0, n1, . . . " are called nodes, a line between two nodes is called a route line, and the route line between n0 and n1 is called route line 1a. In FIG. 2, "O" represents location of landmark and it is described as "O post office" by using a name. The landmark is a building or a sign object in case of guiding a junction point and so on. Attributes, such as type, names, and locations, are added to each landmark. The attribute of a landmark is stored in the map information management unit 2. The attribute of route and the attribute of landmark are utilized in case that the guidance generation unit 4 generates the guidance information.

Figure 3:
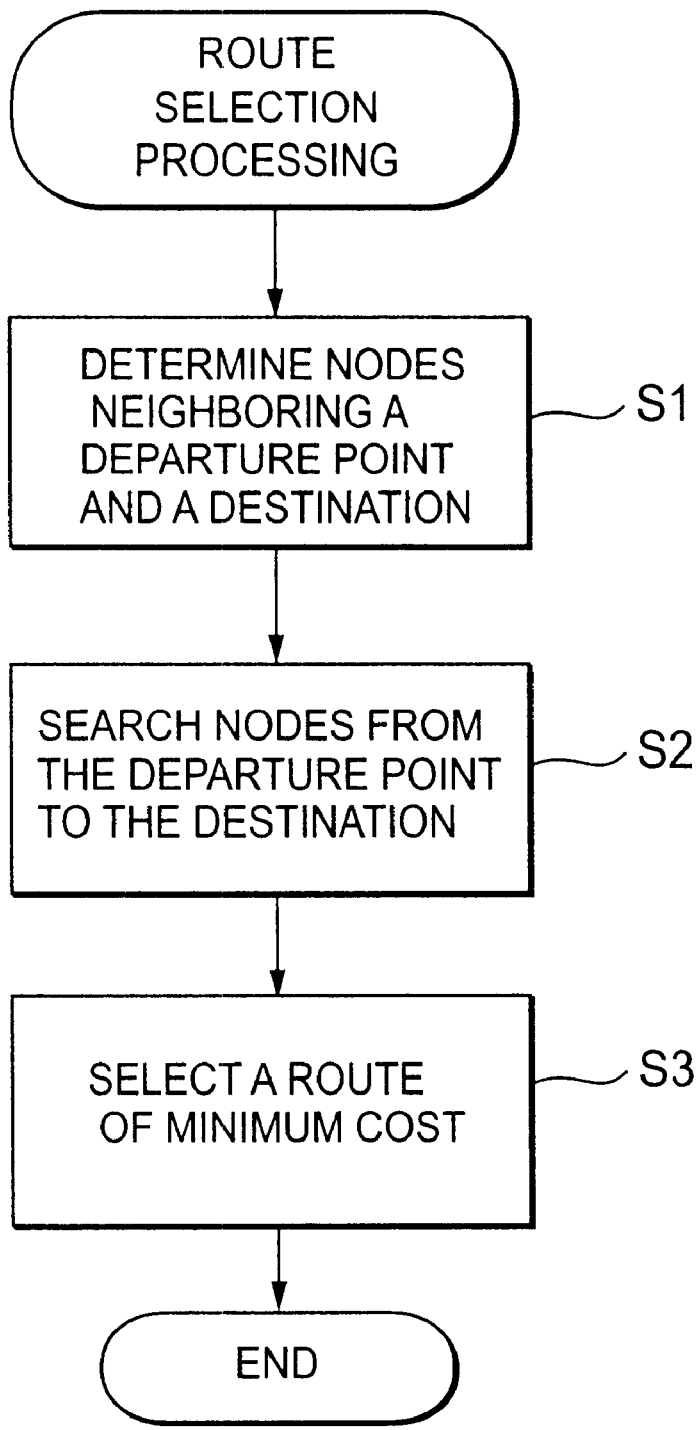
FIG. 3 is a flow chart of route selection processing according to the first embodiment of the present invention.

The route selection unit 1 selects one route from the departure point to the destination in response to the route guidance generation request including the user's input information such as the departure point, the destination, time, and moving means. FIG. 3 is a flow chart of processing of the route selection unit 1.

(S1) The route selection unit 1 selects two nodes neighboring the departure point and the destination by referring to the route network stored in the map information management unit 2.

(S2) From a node of the departure point (Hereinafter, it is called a start node) in order, the route selection unit 1 recursively searches a node connected from the start node through a route line, and searches a plurality of routes each connected from the start node to a node of the destination (Hereinafter, it is called an end node).

(S3) The route selection unit 1 selects one route of minimum cost from the plurality of routes.

Figure 4:
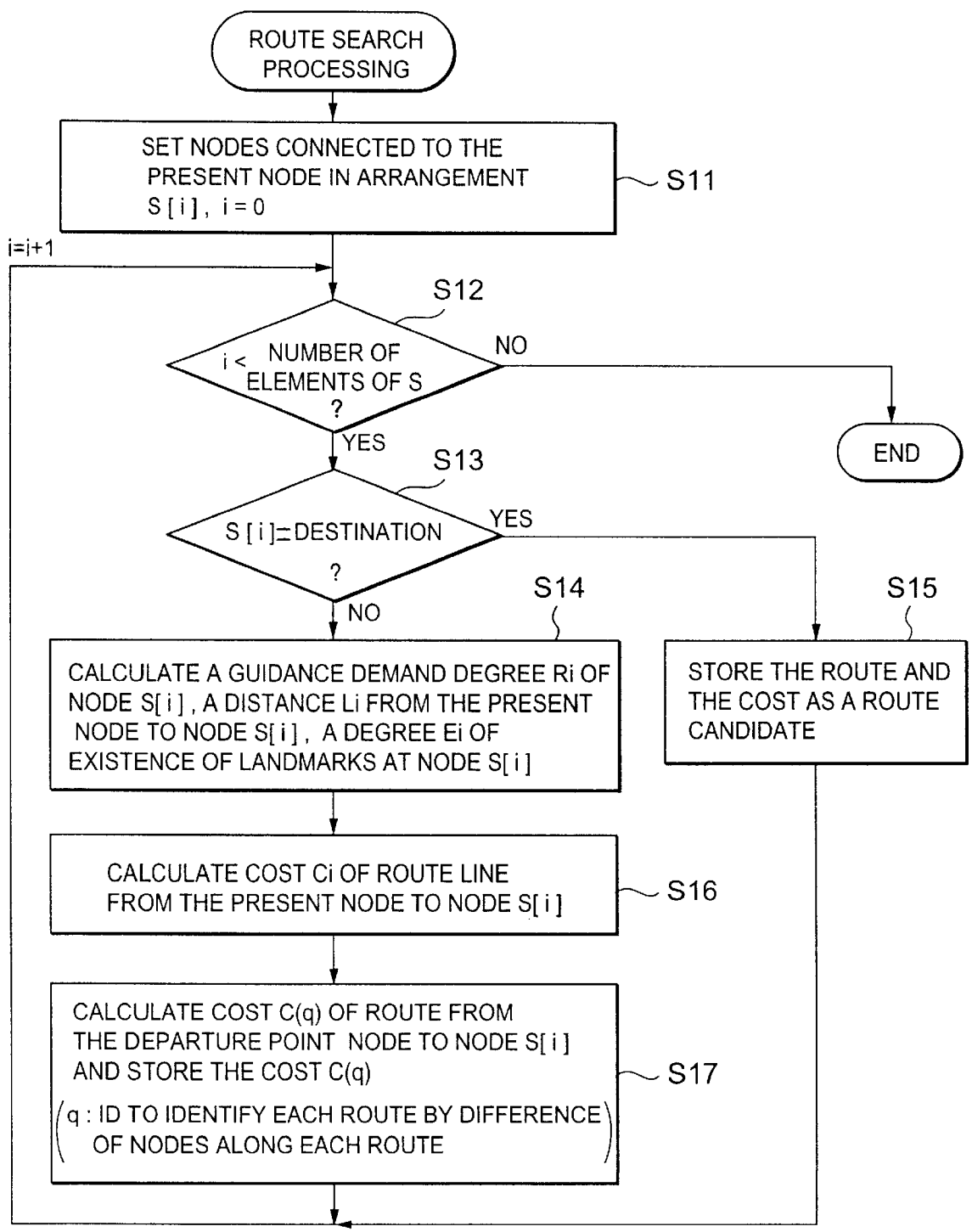
FIG. 4 is a flow chart of route search processing according to the first embodiment of the present invention.

FIG. 4 is a flow chart of detail processing of S2 in FIG. 3. For example, assume that a route from the start node n1 to the end node n4 is searched in FIG. 2.

(S11) The start node n1 is set as a present node, nodes connected to the present node n1 are retrieved from the route network and stored in arrangement S[i]. In FIG. 2, as for the present node n1, "(n2, n5)" is stored in S[i]. In this case, variable i is used to identify each element in the arrangements.

(S12) By incrementing the variable i, processings from S13 to S17 are repeatedly executed for each node in the arrangement S[i] in order. If the processings are completed for all nodes in the arrangement S, processing is returned to S11. Each node as each element in the arrangement S is respectively set as the present node, and processing from S12 (explained as follows) is executed in the same way.

(S13) If a node S[i] as an element in the arrangement S is the node neighboring the destination (i.e., the end node), processing is forwarded to S15. Otherwise, processing is forwarded to S14. For example, processing is forwarded to S14 because a node S[i] is n2.

(S14) The guidance demand degree calculation unit 3 calculates the guidance demand degree of the node S[i]. The guidance demand degree Ri of the node S[i] is stored. Furthermore, a distance Li from the present node to the node S[i] and a degree Ei of existence of landmarks at the node S[i] are calculated and stored. As the degree Ei of existence of landmarks, for example, the sum of landmark proper degree Pj of each landmark located in a predetermined area of the node S[i] is calculated as follows.

$$Ei = \Sigma Pj + \beta$$

The landmark proper degree is a value representing the suitable degree for signpost. Any value from "0" to "1" is assigned to each landmark and stored in the map information management unit 2. "β" is the default value.

(S16) Cost Ci of route line from the present node to the node S[i] is calculated. For example, the cost Ci of the route line is calculated as follows.

$$Ci = \alpha \times Li + Ri/Ei$$

"Li" represents a distance from the present node to the node S[i]. The longer the distance is, the higher the cost Ci is. "Ri/Ei" represents a degree of difficulty for the guidance. The higher the guidance demand degree Ri is and the fewer landmarks are, the higher the cost Ci is. "α" represents a parameter to control a ratio affecting the distance value on cost calculation. In case of calculating the. cost, in addition to the route length Li, route width may affect the cost calculation in the same way as the route length Li.

(S17) Cost C(q) from the start node to the node S[i] is calculated and stored. The variable "q" represents an identifier to discriminate each different route by difference of intermediary node (except for the start node and the end node) along each route. The sum of the costs of each route line from the start node to the node S[i] is the cost C(q) of the route.

Hereinafter, value of "q" is described by listing identifiers (n1, n2, . . . ) of nodes along the route. For example, cost C (n1,n2) of a route from the start node n1 to next node n2 is calculated. Next, "i" is incremented by 1, and processing is forwarded to S12. Hereinafter, as mentioned-above, the processes from S13 to S17 are executed. In this case, as for another next node n5, cost C (n1, n5) from the start node n1 to the node n5 is calculated. At this stage, processing of each element in the arrangement S is completed. Next, processing is returned to S11. For example, the node n2 is set as the present node, and a node n3 connected to the present node n2 is retrieved from the route network information and stored in the arrangement S[i]. In this case, the node n3 is stored in S[i]. Hereinafter, as mentioned-above, cost C (n1, n2, n3) from the start node n1 to the node n3 through the node n2 is calculated. Next, processing is returned to S11. The node n5 is set as the present node, and the node n3 is stored in S[i]. In the same way, cost C (n1, n5, n3) from the start node n1 to the node n3 through the node n5 is calculated. Furthermore, processing returns to S11. The node n3 is set as the present node, and a node n4 connected to the node n3 is stored in S[i]. In this case, the node n4 (S[i]) is the end node. Accordingly, processing is forwarded from S13 to S15.

(S15) Each route from the start node to the node n4 is regarded as route candidate, and the route and the cost are stored. After "i" is incremented by 1, processing returns to S12. For example, "first route (n1, n2, n3, n4) and the cost C (n1, n2, n3, n4)=10", "second route (n1, n5, n3, n4), and cost C (n1, n5, n3, n4)=18", are calculated and stored.

In this way, for example, the node n1 is set as the present node, and the cost of each route to node n0, n2, n5, each connected to the node n1 is respectively calculated. Furthermore, each node n0, n2, n5 is respectively set as the present node, and cost of each route to each next node connected to each node n0, n2, n5, is respectively calculated in the same way. The route calculation is completed when a predetermined number of route candidates are determined or a predetermined time passes. This completion timing may be adjusted by use purpose or operational cost.

In the example of FIG. 2, two routes (n1, n5, n3, n4) and (n1, n2, n3, n4) are obtained as the route candidates. However, there are few landmarks neighboring the node n5. In this case, the degree Ei is low and the cost C is high.

Accordingly, at S3 in FIG. 3, the first route (n1, n2, n3, n4) of which the cost C is minimum is selected.

Next, processing of the guidance demand degree calculation unit 3 is explained. The guidance demand degree calculation unit 3 calculates a degree necessary for guidance at some point. The degree for a pedestrian to feel that guidance is necessary at some point is mainly determined by scene feature of the point. The scene feature includes various elements. In this example, a method for calculating the guidance demand degree based on information obtained from the map information stored in the map information management unit 2 is explained. As the scene feature (signpost) affecting on the point where the pedestrian feels that the guidance is necessary, for example, a non-linearity of route, a complexity of route junction, and a change of route width are taken into consideration.

Figure 5:
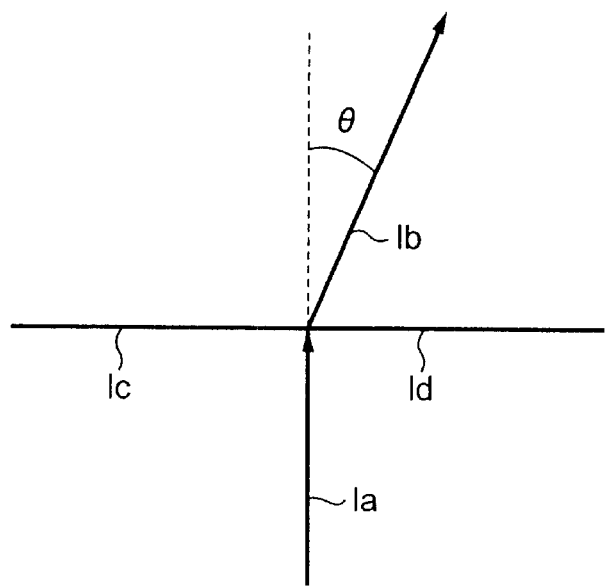
FIG. 5 is a schematic diagram of an evaluation method for the linearity of route.

FIG. 5 is a schematic diagram to explain an evaluation method for the linearity of route. By change angle θ between a route line 1a and a route line 1b in case of advancing from the route line 1a to the route line 1b, the evaluation value is determined as follows.

0≦θ<22.5° . . . evaluation value of linearity is "0"

22.5°≦θ<67.5° . . . evaluation value of linearity is "0.3"

67.5°≦θ . . . evaluation value of linearity is "0.5"

The evaluation value of linearity is called linearity degree. The linearity degree represents that the guidance demand degree becomes large in proportion as the angle θ becomes large.

Figure 6:
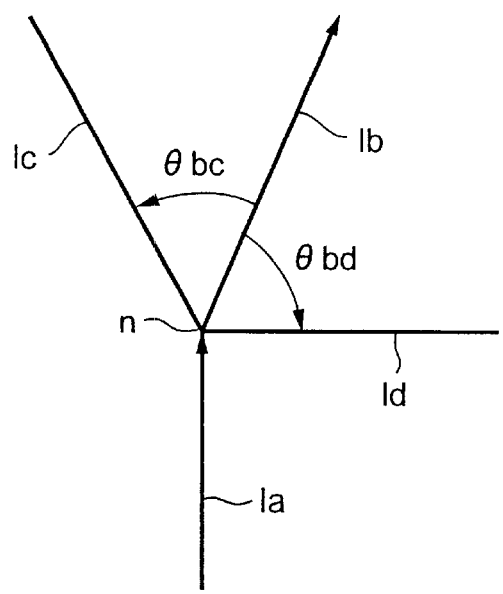
FIG. 6 is a schematic diagram of an evaluation method for the complexity of route junction.

FIG. 6 is a schematic diagram to explain an evaluation method for complexity of route junction. In case of advancing from a route line 1a to a route line 1b, if two route lines 1c and 1a cross at a node n, the evaluation value is determined by a cross angle θ bc between two route lines 1b and 1c, and a cross angle θ bd between two route lines 1b and 1d as follows.

0≦θ<67.5° . . . evaluation value of complexity is "0.6"

67.5°≦θ<112.5° . . . evaluation value of complexity is "0.6"

112.5°≦θ<180° . . . evaluation value of complexity is "0"

The evaluation value of complexity is called a complexity degree. The complexity degree represents that, a course decision is difficult and the guidance demand degree becomes large if a junction route of which direction is close to route line 1b exists.

Figure 7A:
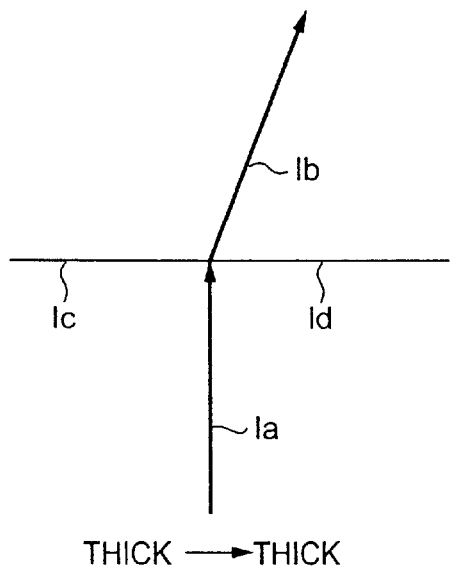
FIGS. 7A, 7B, 7C and 7D are schematic diagrams of an evaluation method for the change of route width.
Figure 7B:
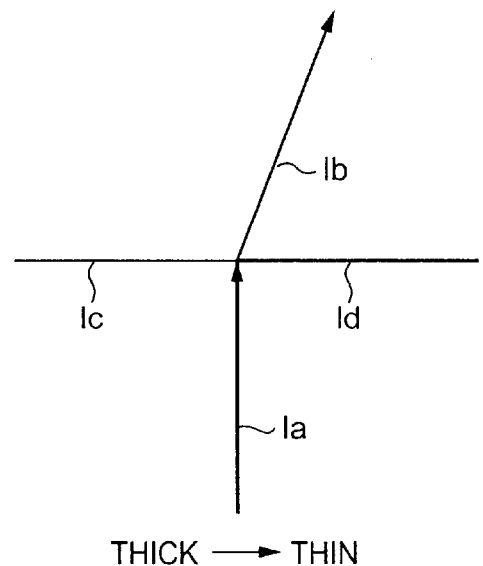
Figure 7C:
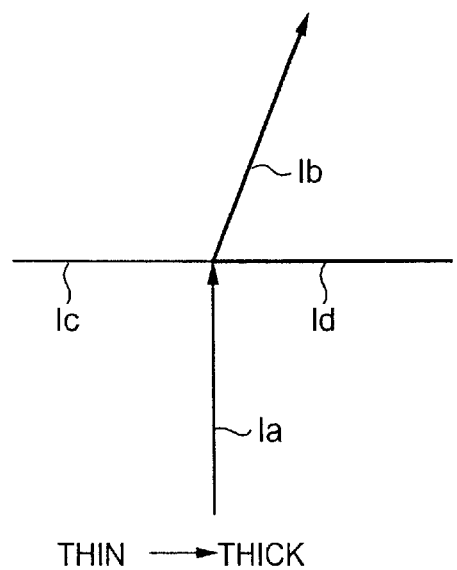
Figure 7D:
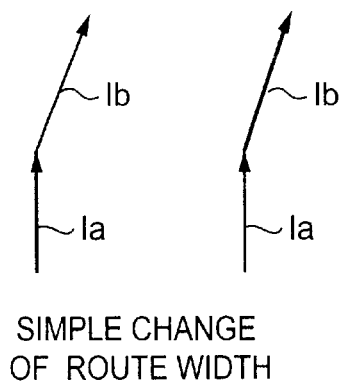

FIGS. 7A, 7B 7C and 7D are schematic diagrams to explain an evaluation method for a change in the route width. The evaluation method is classified into three cases based on relation of route width between the pedestrian's route (route lines 1a and 1b) represented by an arrow and a branch line (lines 1c and 1d). In FIG. 7A, the route line 1a and 1b are thicker than another route 1c and 1d. In FIG. 7B, the route line 1a and another route 1d are thick. The pedestrian advances from the thick route 1a to a thin route 1b. In FIG. 7C, conversely, the pedestrian advances from a thin route 1a to a thick route 1b. In FIG. 7D, the route width is simply changed without continuous thick route. In these cases, the evaluation value is determined as follows.

In case of FIG. 7A . . . evaluation value of change of route width is "−0.3"

In case of FIG. 7B . . . evaluation value of change of route width is "0.3"

In case of FIG. 7C . . . evaluation value of change of route width is "0.2"

In case of FIG. 7D . . . evaluation value of change of route width is "0.2"

The evaluation value of change of route width is called a change degree of route width. The change degree of route width represents that, the guidance demand degree becomes small in case of FIG. 7A, and the guidance demand degree becomes large in case of FIGS. 7B, 7C and 7D. Furthermore, even if the width of the pedestrian's route does not change if a thin route crosses another thick route, the guidance demand degree becomes large. In this case, for example, the change degree of route width is "0.2".

The guidance demand degree based on the abovementioned three evaluation methods is calculated as follows.

$$R = (\text{linearity degree}) + A \times (\text{complexity degree}) + B \times (\text{change degree of route width}).$$

In above equation, A is parameter to control ratio of the complexity degree and B is parameter to control ratio of the change degree of route width. An example offsetting personal difference by adjusting the parameter is explained in the third embodiment.

The above-mentioned three evaluation methods include several correlation relations.

For example, each element degree affecting on the guidance demand degree R changes as follows.

FIGS. 8A and 8B are schematic diagrams of examples in which evaluation standard of linearity is lightened by the complexity degree. As shown in FIG. 8A, in case of low complexity degree, the guidance demand degree stays small even if the change angle θ between two route lines 1a and 1b (pedestrian's route) is large to some extent. Accordingly, the evaluation value of linearity degree is lightened as follows.

$0 \leq \theta < 45°$ . . . evaluation value is "0"

$45° \leq \theta < 67.5°$ . . . evaluation value is "0.3"

FIGS. 9A, 9B, and 9C are schematic diagrams of example, in which the complexity degree becomes small if the width of the pedestrian's two route lines 1a and 1b is thicker than another route line 1c crossing the two route lines 1a and 1b at a node n. In general, a plurality of continuous thick routes is regarded as one connected route. Accordingly, in comparison with the case that the route width does not change, effect of the complexity degree is lightened. In this case, the evaluation value of complexity degree is set at a lower value as follows.

$0 \leq \theta < 67.5°$ . . . evaluation value is "0.2"

$67.5° \leq \theta < 112.5°$ . . . evaluation value is "0.1"

$112.5° \leq \theta < 180°$ . . . evaluation value is "0"

FIGS. 10A and 10B are schematic diagrams of examples in which the linearity degree becomes small if the width of the pedestrian's two route lines 1a and 1d is thicker than another two route lines 1b and 1c crossing the two route lines 1a and 1d at a node n. As shown in FIG. 10A, if the pedestrian's route is changed from a route line 1a to a route line 1d, the continuous two thick routes are generally recorded as one connected route. Accordingly, the guidance demand degree of FIG. 10A is lower than the guidance demand degree of FIG. 10B. In case of FIG. 10A, the evaluation value of linearity degree is set at a lower value as follows.

$0 \leq \theta < 22.5°$ . . . evaluation value is "0"

$22.5° \leq \theta < 67.5°$ . . . evaluation value is "0.2"

$67.5° \leq \theta$ . . . evaluation value is "0.4"

The above-mentioned three evaluation methods for calculating the guidance demand degree are determined by analyzing data collected from a field test or an questionnaire of many testees. In above-mentioned example, the evaluation value of which ordinary person walks along the route is represented. However, by analyzing in the same way, the evaluation value may be adjusted for the aged, the handicapped, or someone riding a bicycle.

Figure 11:
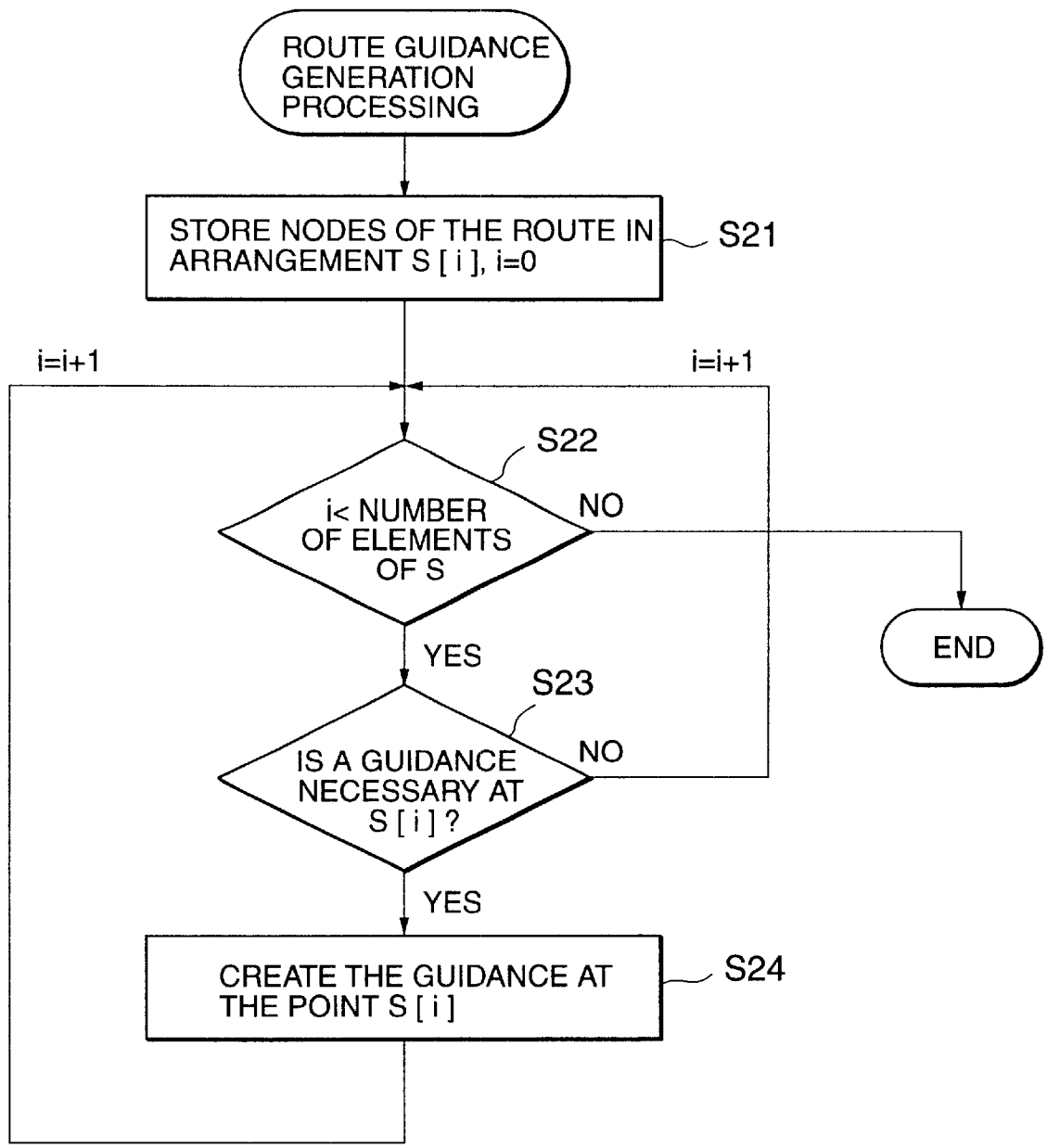
FIG. 11 is flow chart of route guidance generation processing according to the first embodiment of the present invention.

Next, the guidance generation unit 4 is explained. The guidance generation unit 4 generates guidance information to guide a route selected by the route selection unit 1. FIG. 11 is a flow chart of processing of the guidance generation unit 4.

(S21) Route information sent from the route selection unit 1 is stored in the arrangement S. In example of FIG. 2, "(n1, n2, n3, n4)" is stored in the arrangement S. In this case, variable i is used to identify each element of the arrangement S.

(S22) By incrementing the variable i, processing S23 and S24 is repeatedly executed for each node of the route stored in the arrangement S. When the processing for all nodes in the arrangement S is completed, generated guidance information is output.

(S23) It is decided whether the guidance is necessary for a point of node S[i] as an element of the arrangement S. If the guidance is decided to be necessary, processing is forwarded to S24 in order to generate the guidance. If the guidance is decided not to be necessary, the processing is executed for the next node S[i+1] in the arrangement S. The decision whether guidance is necessary is determined by the guidance demand degree of node S[i]. If the guidance demand degree is high, it is decided that guidance is necessary at the point. Concretely, if the guidance demand degree is above a threshold as a decision standard to decide that guidance is necessary, guidance information is generated. Even if the guidance demand degree is below the threshold, if the distance between the present node and the previous node is long, or the guidance at the previous node is insufficient, it is decided that guidance at the present node is necessary.

(S24) The guidance information to guide a point of the present node S[i] is generated. In this case, by regarding a previous node (for example, node S[i−1]) where the guidance information was generated just before the present node S[i] as a base point, guidance information of explanation using landmarks at the present node S[i] is generated.

Figures 12, 13:
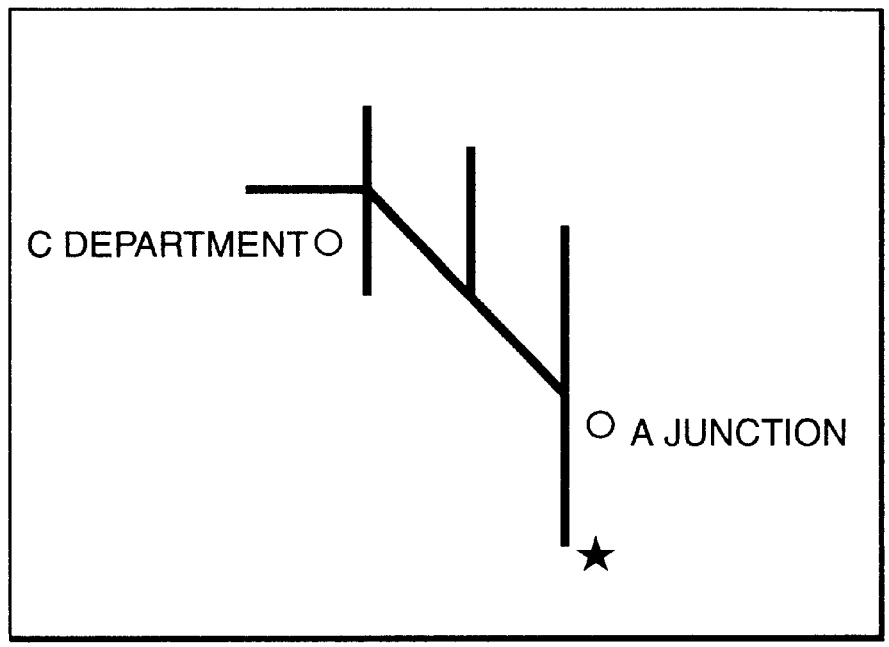
FIG. 12 is a schematic diagram of a first example of presentation of the guidance information.
FIG. 13 is a schematic diagram of a second example of presentation of the guidance information.
Figure 14:
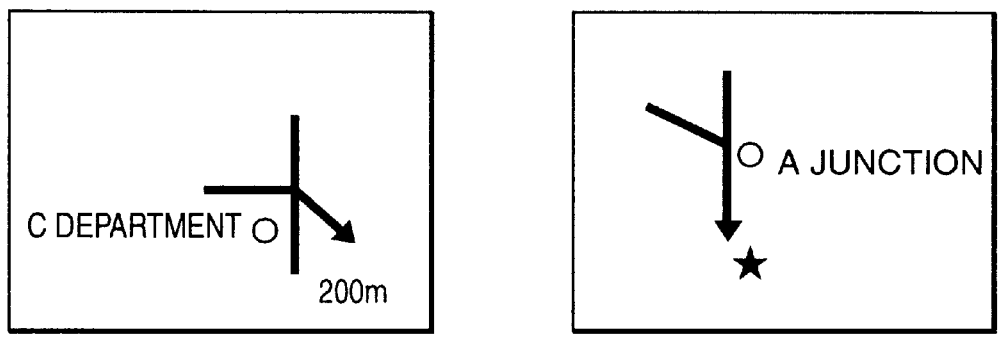
FIG. 14 is a schematic diagram of a third example of presentation of the guidance information.
Figure 15:
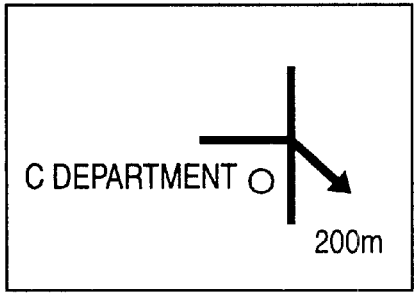
FIG. 15 is a schematic diagram of a fourth example of presentation of the guidance information.

An output format of the guidance information is determined by specification of the guidance information output unit 2 or the user's indication such as a simplified map, text, or speech. FIGS. 12, 13, 14, and 15 show various presentation types of guidance information output from the guidance information output unit 6. FIG. 12 shows one example of presentation by the simplified map. FIG. 13 shows one example of presentation by text. FIG. 14 shows one example of presentation by a rally map in which a series of simplified maps of nodes of high guidance demand degree are displayed in order. In FIG. 15, for a point having a high guidance demand degree (above a predetermined value higher than the threshold to decide that guidance is necessary) or a point where explanation by text is difficult because of non-existence of landmarks, the guidance information is presented by the simplified map, and the guidance information for other points is presented by text. In short, the presentation format may be a combination of text and the simplified map. By the above-mentioned processing, the route guidance generation apparatus calculates the guidance demand degree (for the pedestrian to lose his way of the point) by referring to the map information, selects a route for the pedestrian not to lose his way, and generates the route guidance information based on the guidance demand degree of the node along the selected route.

Next, a concrete example of presentation of the guidance information is explained. FIGS. 16A, 16B and 16C show examples in which a node, where the guidance is presented, changes according to the guidance demand degree in the map. FIG. 16A shows the map information. FIG. 16B shows the guidance information of a route (n0, n1, n2, n3, n4) when the user walks from node n0 to node n4 in FIG. 16A. FIG. 16C shows the guidance information of a route (n4, n3, n2, n1, n0) when the user walks from node n4 to node n0 in FIG. 16A. In FIGS. 16B and 16C, the guidance information is text. In both cases of advancing from node n0 to node n4 and advancing from node n4 to node n0, intermediate nodes through which the user passes are the same. However, in case of advancing from node n0 to node n4, the complexity degree is high at a point of node n2, and the guidance demand degree is high at the node n2. Accordingly, as shown in FIG. 16B, a guidance sentence "Go straight at the B bank." is added. In case of advancing from node n4 to node n0, the complexity degree is low at the point of node n2, and the guidance demand degree is low at the node n2. Accordingly, as shown in FIG. 16C, the guidance sentence is not added. If the guidance information is generated by a prior method (i.e., without the guidance demand degree), the guidance information at the node n2 shown in FIG. 16B is not generated.

Figure 17A:
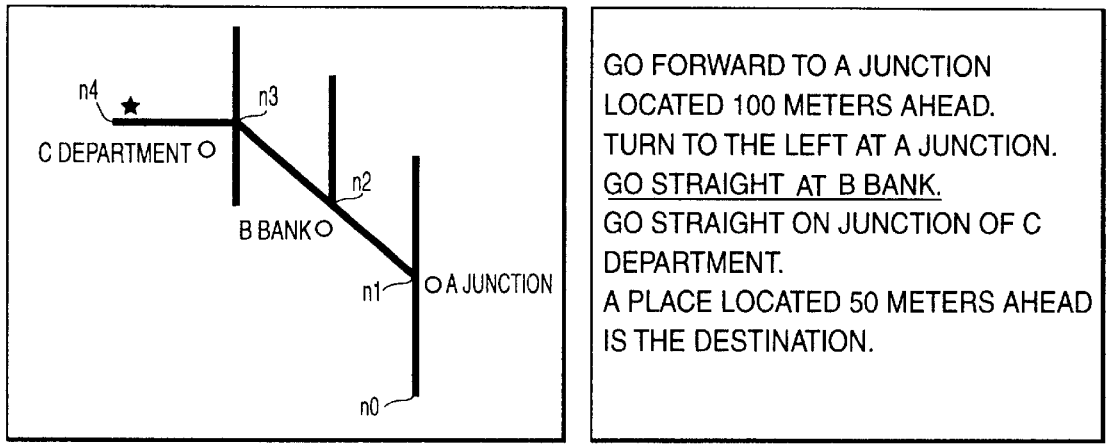
FIGS. 17A and 17B are schematic diagrams of an example that explanation for principal reason why the guidance demand degree is added to the guidance information.
Figure 17B:
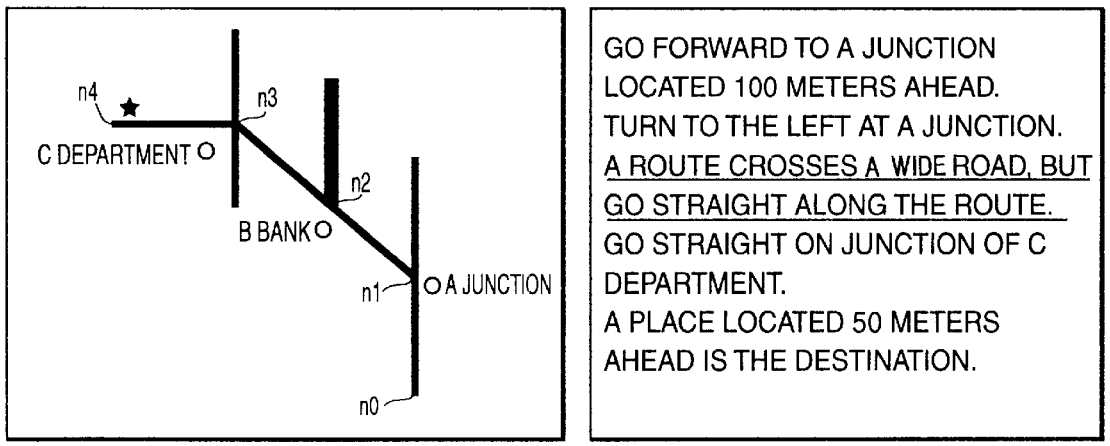

FIGS. 17A and 17B show examples of guidance information to which explanation for principal reason why the guidance demand degree is high is added by noticing each element "linearity degree", "complexity degree" and "change degree of route width" of the guidance demand degree R. In the map information of the left side of FIG. 17A, in case of advancing from node n0 to node n4, the guidance information of route (n0, n1, n2, n3, n4) is shown on the right side of FIG. 17A. In the same way, in the map information of the left side of FIG. 17B, in case of advancing from node n0 to node n4, the guidance information of route (n0, n1, n2, n3, n4) is shown on the right side of FIG. 17B. As shown in the map information of the left side of FIG. 17B, the pedestrian's (user's) route crosses another thick route at a node n2. In short, at a point of node n2, it is possible that the user feels uneasy about how to advance based on the widths of two crossing routes. The guidance demand degree of this node n2 is higher because of effect of the change degree of route width in comparison with the guidance demand degree of node n2 on the left side of FIG. 17A. In other words, the guidance demand degree of node n2 in the left side of FIG. 17B is high by large weight of the change degree of route width, i.e., effect of the change degree of route width is large at node n2. Accordingly, as shown on the right side of FIG. 17B, the explanation "A route crosses a wide road, but go straight along the route." is added to the guidance information. In this way, the guidance information generation unit 4 generates the guidance information by referring to each element "linearity degree" "complexity degree" "change width of route width" of the guidance demand degree of each node.

Figure 18:
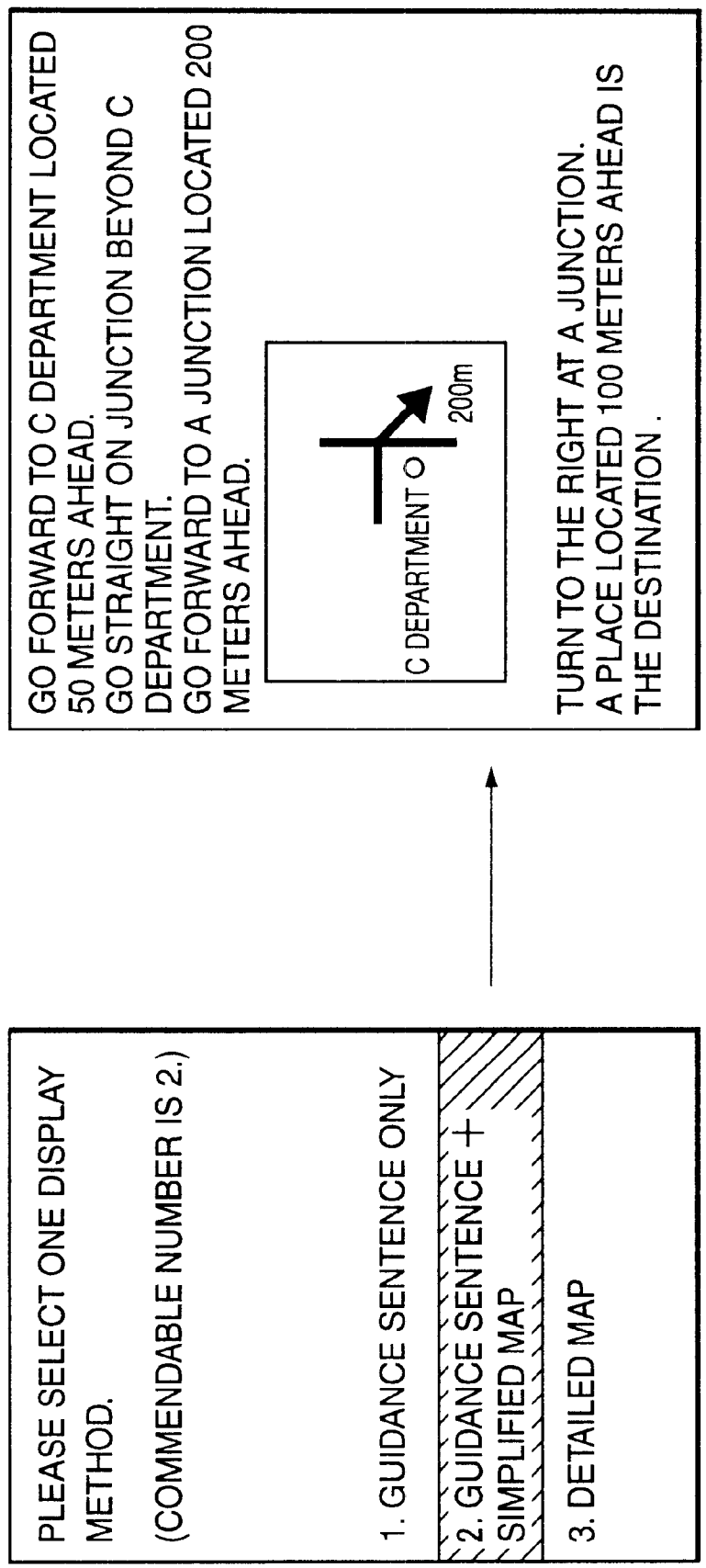
FIG. 18 is a schematic diagram of a display on which a presentation method of the guidance information for a point to be guided is supposed for the user.

FIG. 18 shows an example to suppose a presentation format of the guidance information for the user according to the guidance demand degree R of each node along the route. As for the guidance information generated by the prior method, the presentation format is indicated by the user. However, a node having too high a guidance demand degree R often exists along the route, or it is often difficult to easily explain by text because the complexity degree is too high. In these cases, the simplified map image of large size is used even if the file size is large, or the text is combined with the simplified map. On the other hand, in a route guidance system of the prior art, after the user confirms guidance information of presentation format indicated once and confirms that the presentation format is not useful, he must indicate a new presentation format again and request a route guidance request from the begining.

However, in the present invention, the guidance demand degree R is already calculated. Accordingly, by checking the guidance demand degree of each node along the selected route, (for example, when the guidance generation unit 4 generates the guidance information), the presentation format is determined, and this decision result of presentation format with the guidance information is supplied to the guidance information output unit 6. As shown on the left side of FIG. 18, the guidance information output unit 18 proposes the presentation format for the user. On the left side of FIG. 18, "2.GUIDANCE SENTENCE+SIMPLIFIED MAP" is reversely displayed, and it is indicated for the user that a presentation format of the guidance sentence and the simplified map is suitable.

As a decision method of presentation format of guidance information, it is decided by the number of nodes each of which the guidance demand degree R is above the threshold and the number of landmarks at each node. For example, if the landmark exists for all nodes necessary for guidance, the guidance sentence is only presented. If a good landmark does not exist for one or two nodes in all nodes necessary for guidance, a combination of the guidance sentence and the simplified map is presented. If a good landmark does not exist for at least three nodes in all nodes necessary for guidance, a detailed map is presented. Furthermore, even if landmarks exist for all nodes necessary for guidance, if the total number of nodes is above a predetermined value, the number of guidance sentences is large and the user cannot easily understand. In this case, a combination of the guidance sentence and the simplified map may be presented.

When deciding the presentation format of the guidance information, if the route guidance is decided to be difficult, i.e., if the number of nodes necessary for guidance (the guidance demand degree R is above a threshold) is large (above a predetermined value), or if a landmark does not exist for at least five nodes in the set of nodes necessary for guidance, a warning that the output guidance information may be useless should be informed to the user. FIG. 19 shows one example of a display including the warning output from the guidance information output unit 6. In FIG. 19, difficulty of the route guidance is informed, and completion of utilization or detailed map is alternatively indicated to the user. In case of selecting a route by the route selection unit 1, the route of minimum cost C is selected. In this case, if the minimum cost C is above a predetermined value, the route guidance is decided to be difficult, and a display shown in FIG. 19 may be presented.

As mentioned-above, in the first embodiment, the guidance demand degree of arbitrary point along the route from a departure point to a destination is calculated based on three elements (linearity of route, complexity of route junction, change of route width) as scene features of the point. The most suitable route is selected from a viewpoint for the pedestrian not to lose his way from the departure point to the destination based on the guidance demand degree, the distance, and the proper degree of landmark. The guidance information is generated for a point decided to be necessary for guidance based on the guidance demand degree. As a result, selection of route and generation of accurate route guidance not to lose the user's way are possible. In the prior art, route guidance of insufficient map information or without proper landmark of the point is presented as it is, and the user often feels unsatisfaction. However, in the present invention, the user's unsatisfaction degree is eased. Furthermore, as shown in the right side of FIG. 17B, explanation of principal reason why the guidance is decided to be necessary is added to the guidance information, and more accurate route guidance is possible.

Furthermore, in case of selecting the route, if the most suitable route cannot be selected from a viewpoint not to lose the user's way based on the guidance demand degree, or if the number of points necessary for guidance is large and the guidance information is enormous, presentation of useless information gives unsatisfaction for the user. However, in order not to betray the user's reliance, a message that the route guidance is difficult is presented instead of the guidance information.

Furthermore, as shown in FIG. 15, if the guidance demand degree of a point decided to guide is above a predetermined value, the guidance information of the point is presented as a simplified map, and the guidance information of the other points is presented by text. In short, presentation format of the guidance information for a point decided to guide is determined by the guidance demand degree of the point. As a result, more accurate route guidance is possible.

Furthermore, the presentation format of the guidance information is decided based on the number of points decided to be guided, and the presentation format is proposed for the user shown on the left side of FIG. 18. If only text guidance information is presented in response to the route guidance request, a user may not easily understand the guidance information because the number of sentences is too large. In the prior art, the user must request route guidance again in order to change the presentation format as a combination of text and simplified map. However, in the present invention, this useless operation is not necessary.

Figure 20:
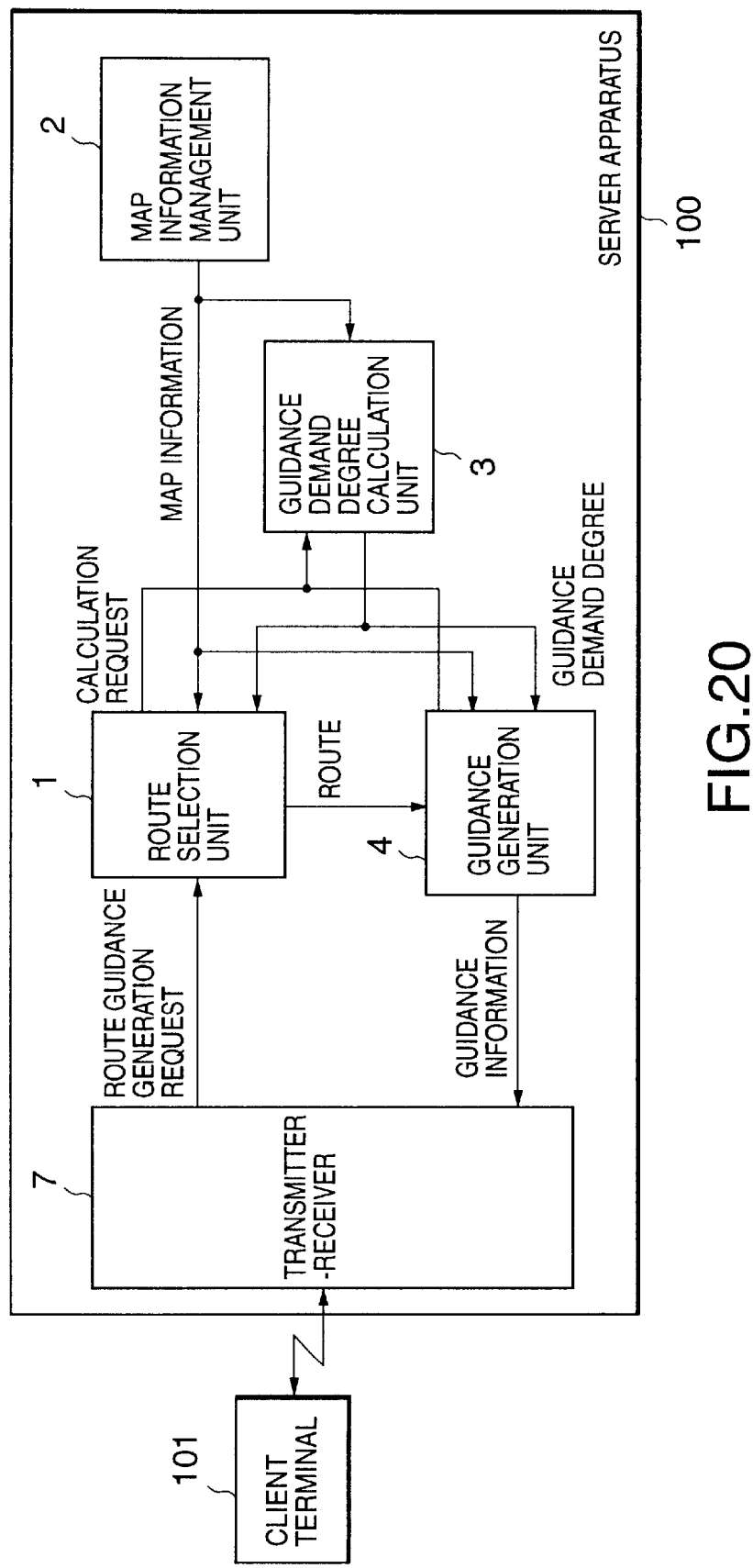
FIG. 20 is a block diagram of a server apparatus according to a second embodiment of the present invention.

In the first embodiment, the route guidance generation apparatus of stand-alone is explained. However, as shown in FIG. 20, components of the main unit of the route guidance generation apparatus shown in FIG. 1 may be in a server apparatus 100, and the route guidance information is then presented to a client terminal connected to the server apparatus 100 through a predetermined network such as the Internet. This route guidance system of the second embodiment can be realized in the same way as the first embodiment. In this case, as shown in FIG. 20, the server apparatus 100 includes the route selection unit 1, the map information management unit 2, the guidance demand degree calculation unit 3, the guidance generation unit 4, and a transmitter/receiver 7 to communicate with the client terminal 101. In FIG. 20, the same sign is assigned to each unit the same as the unit in FIG. 1, and units different from FIG. 1 are explained below. The client terminal 101 is, for example, a communication terminal of portable type, and may be a wireless handheld device, a cellular phone or a PHS device. The transmitter/receiver 7 communicates with the client terminal 101 using a Protocol such as HTTP (Hypertext Transfer Protocol). For example, when the client terminal 101 connects to the server apparatus 100 through the Internet, the server apparatus 100 presents an input screen such as a departure place and a destination.

After the user inputs predetermined items through the input screen on a display of the client terminal 101, the client terminal 101 transmits a request of route guidance generation to the server apparatus 100. In response to the request, the server apparatus 100 generates guidance information in the same way as in the first embodiment, and transmits the guidance information through the transmitter/receiver 7 to the client terminal 101. The client terminal 101 receives the guidance information from the server apparatus 100, and outputs on the display or by speech.

Figure 21:
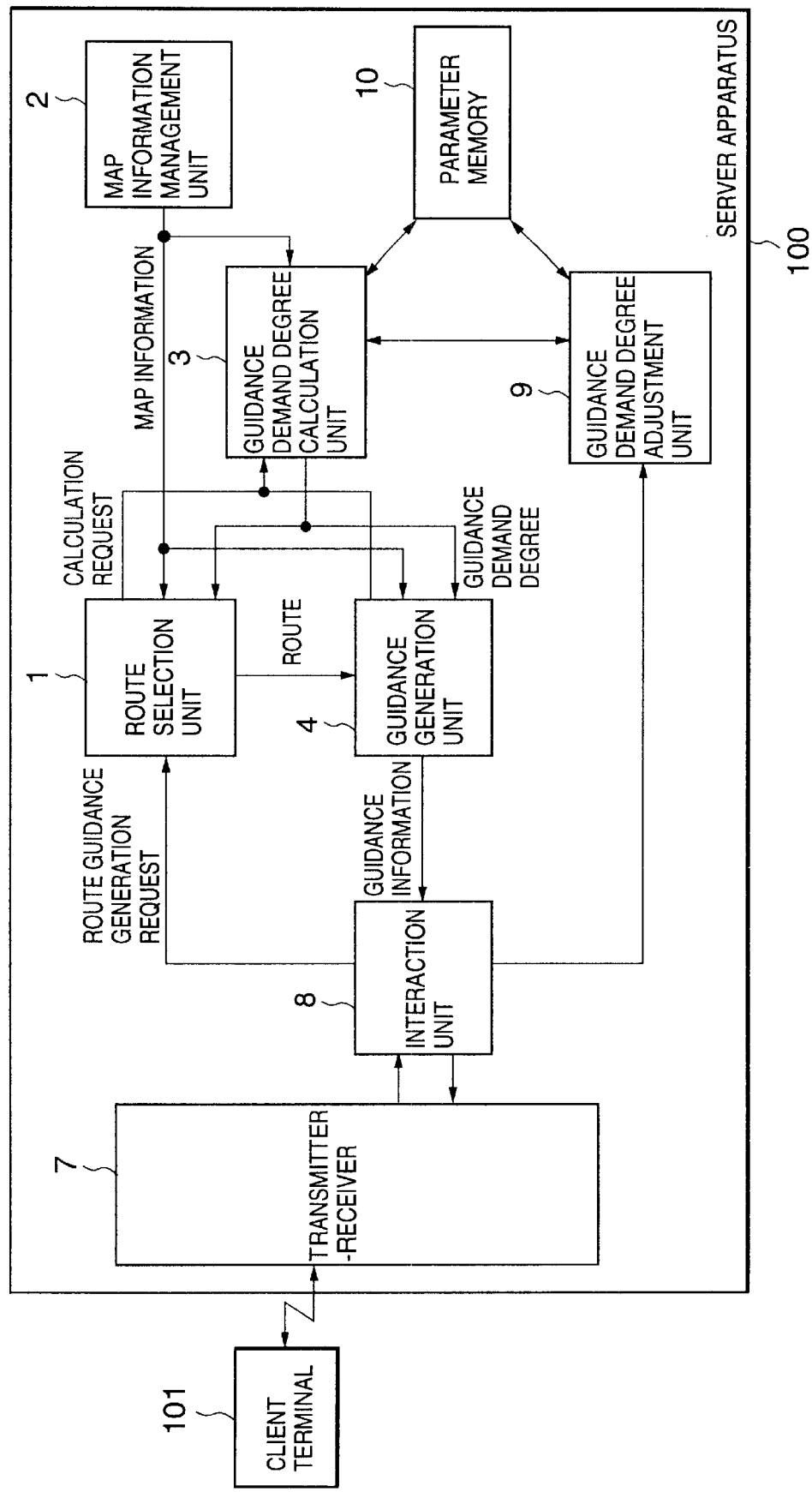
FIG. 21 is a block diagram of a server apparatus according to a third embodiment of the present invention.

FIG. 21 is a block diagram of the route guidance system for interactively executing route guidance for a user according to a third embodiment of the present invention. In FIG. 21, the same sign is assigned to each unit the same as the unit in FIG. 20, and units different from FIG. 20 are explained below. In the server apparatus 100 in FIG. 21, an interaction unit 8 and a guidance demand degree adjustment unit 9 are added. The interaction unit 8 inputs a user's inquiry (question) and the user's present location transmitted from the client terminal 101, and outputs guidance information based on the input information, i.e., interactively executes the route guidance for the user. The user inputs his inquiry to transmit to the server apparatus 100 by speech from the client terminal 101, and the speech recognition result is transmitted to the server apparatus 100. Otherwise, the user may input his inquiry by key input from the client terminal 101. When the server apparatus 100 outputs guidance information to the client terminal 101, speech, image, or text is used as the guidance information. The guidance demand degree adjustment unit 9 stores interactive hysteresis of the user for the route guidance by the interaction unit 8, and adjusts parameters A and B as the user's suitable value in the following equation to calculate the guidance demand degree R.

$$R = \text{(linearity degree)} + A \times \text{(complexity degree)} + B \times \text{(change degree of route width)}$$

The other units are the same as the first embodiment.

Figure 22:
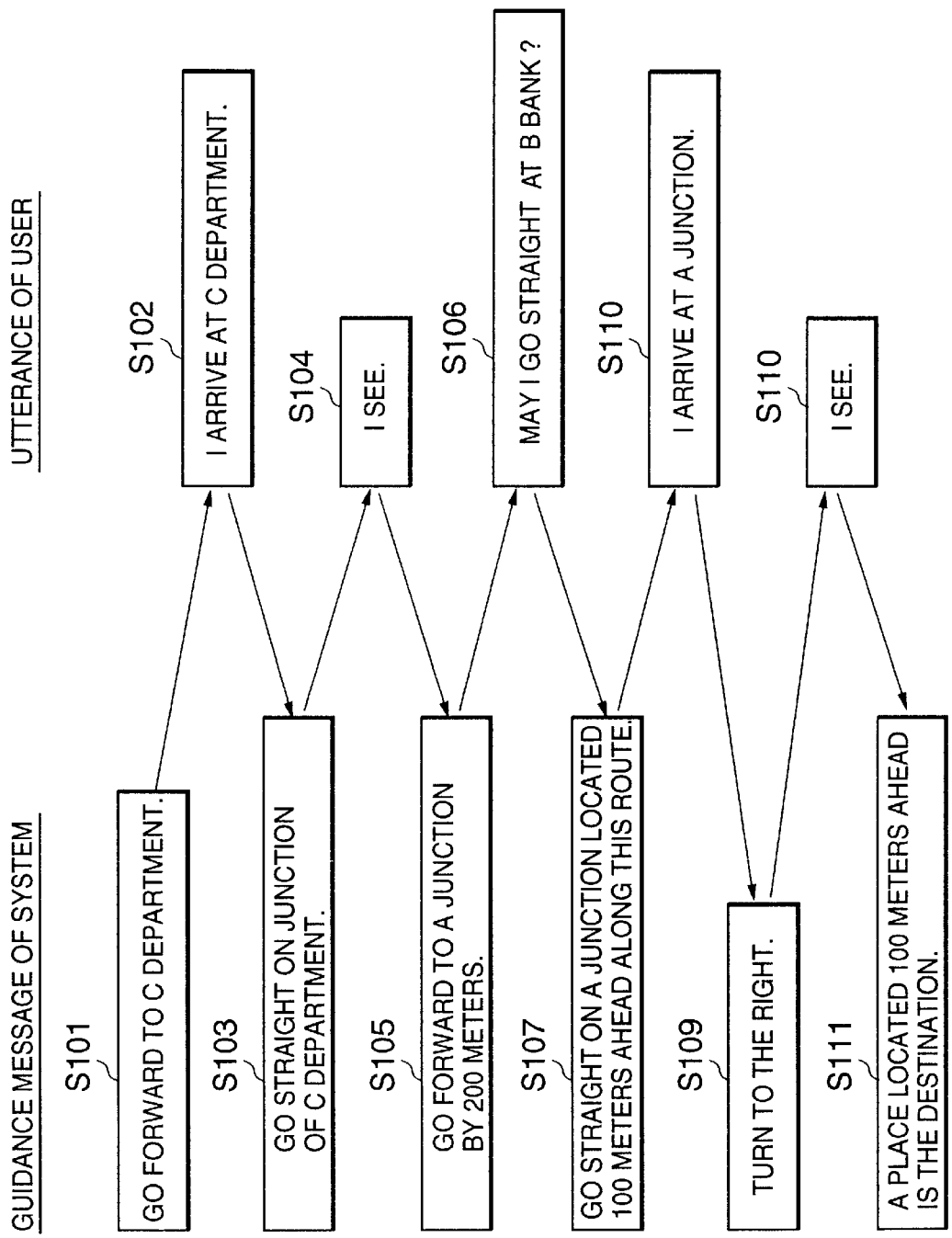
FIG. 22 is a schematic diagram of an example that the route guidance is interactively presented in response to the user's reply.

FIG. 22 shows one example of a dialogue between the route guidance system and the user in case of guiding a route (n4, n3, n2, n1, n0) from node n4 to node n0 in the map information of FIG. 16A. The left side of FIG. 22 shows guidance messages from the server apparatus 100, and the right side of FIG. 22 shows the user's utterance. In this example, interaction of natural sentence is shown. In case of the same contents of the dialogue, the guidance demand degree adjustment unit 9 can process the dialogue record input by speech, key, or menu selection. In this route, for example, a point of which the guidance demand degree R is high is node n3 and node n1. The guidance information automatically generated by the server apparatus 100 is guidance for these two nodes (S101, S103, S105, S109, S111). At the node n2, as shown in S106, the user's inquiries "May I go straight at the B bank?". In response to this inquiry, as shown in S107, the guidance message "Go straight on A junction located 100 meters ahead along this route." is generated. Accordingly, based on the dialogue shown in FIG. 22, the guidance demand degree of node n2 is decided to be low for this user in the guidance demand degree of each node calculated by the guidance demand degree calculation unit 3. In short, from the dialogue shown in FIG. 22, the guidance demand degree adjustment unit 9 decides that the complexity degree affects on the guidance demand degree of node n2 by referring to each element used for calculation of the guidance demand degree R, and decides that effect of the complexity degree of this user for the guidance demand degree must be strengthened. In the same way, in case of the same dialogue at a point where the change degree of route width is effective, the guidance demand degree adjustment unit 9 decides that effect of the change degree of route width of this user must be strengthened. Conversely, even if the guidance information is generated for a node of which the guidance demand degree is high, if the user indicates unnecessary request of guidance of the node, the guidance demand degree adjustment unit 9 decides that effect of element raising the guidance demand degree of the node must be weakened in each element for calculation of the guidance demand degree. As a method for the user to indicate the unnecessary request of guidance, for example, in case that the guidance message shown in FIG. 22 presented by the server apparatus 100 is output through the client terminal 101 by speech, the user may input a predetermined operation through the client terminal 101 after outputting the guidance message (For example, input of predetermined key). Furthermore, in case that the guidance message shown in FIG. 22 is output through the client terminal 101 by text, a check box to input "check" sign for unnecessary request is set in the guidance message, or the user may input a predetermined operation through the client terminal 101 after outputting the guidance message (For example, input of predetermined key). Furthermore, if the user's inquiry includes "Which way should I go?" or "This route crosses another wide route. Which route should I take?" related to a calculation element of the guidance demand degree, the guidance demand degree adjustment unit 9 decides that effect of the calculation element must be strengthened.

Figure 23:
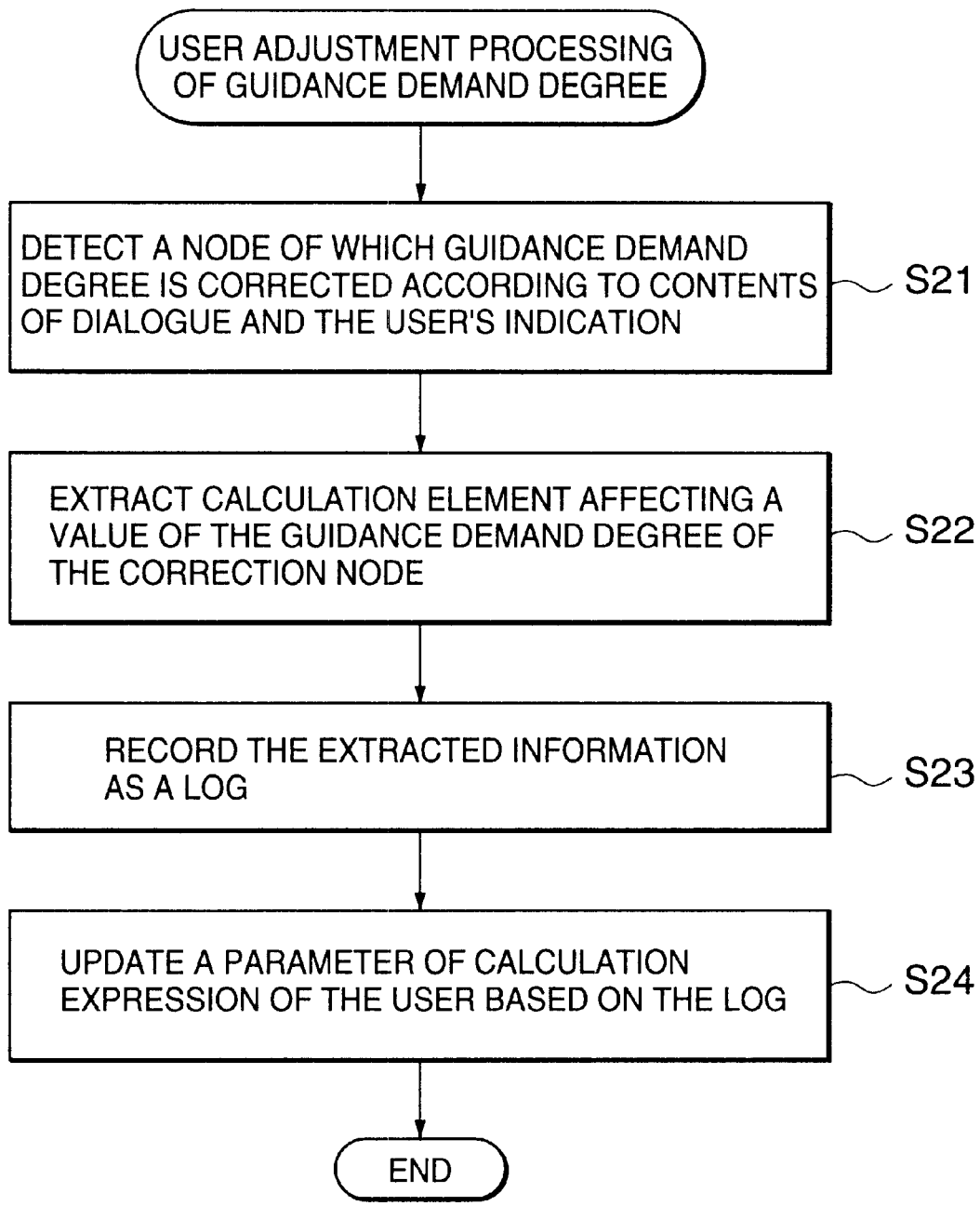
FIG. 23 is a flow chart of user adjustment processing of guidance demand degree according to the third embodiment of the present invention.

Hereinafter, by referring to a flow chart shown in FIG. 23, processing of the guidance demand degree adjustment unit 9 is explained. As mentioned-above, the guidance demand degree adjustment unit 9 detects node to correct the guidance demand degree according to the analysis result of the dialogue contents of the user's response for the presented guidance information (For example, including unnecessary request of the guidance information) (S21). Then, the guidance demand degree adjustment unit 9 extracts a calculation element of the guidance demand degree of which effect is corrected from calculation elements affecting on the guidance demand degree of node to be corrected, and extracts information representing whether the effect is strengthened or weakened according to the dialogue contents and value of each calculation element used for the guidance demand degree (S22).

FIG. 24 shows one example of information extracted from a dialogue through the interaction unit 8 by the guidance demand degree adjustment unit 9. The guidance demand degree adjustment unit 9 checks whether a node to be corrected exists according to the dialogue obtained from the interaction unit 8 in real time, or according to temporary stored (or buffered) record of the dialogue at the proper timing. Whenever the node to be corrected is detected, the guidance demand degree adjustment unit 9 records the extracted information from the dialogue as a log in table format shown in FIG. 24 (S23). In FIG. 24, "CORRECTION NODE" represents a number Q of node decided to correct the guidance demand degree, and a unique ID to identify the node is used as the number Q. "IN-NODEN" and "OUT-NODE" respectively represents node numbers of previous node and next node for the correction node along a route when the node of which the guidance demand degree is corrected is detected. "CORRECTION ELEMENT" represents a calculation element to be corrected in the guidance demand degree. "STRENGTH AND WEAKNESS" represents whether effect of the correction element is strengthened or weakened.

"CORRECTION CONTENTS" represents the correction result by adjusting the correction element. At the first column in the table of FIG. 24, for example the log corresponding to the dialogue in FIG. 22 is recorded. In short, a log representing that effect of the complexity degree of node n2 is strengthened so that the node n2 becomes a node necessary for guidance is recorded.

The guidance demand degree adjustment unit 9 calculates parameters A and B by referring to the table shown in FIG. 24. As the calculation method, it is decided whether effect of each calculation element is strengthened or weakened by majority of log in the table. For example, the number of logs of which the complexity degree is strengthened, the number of logs of which the change degree of route width is weakened, are counted. Based on the counted result, parameter A is magnified in case of strengthing the complexity degree, parameter B is reduced in case of weakening the change degree of route width, and both parameters A and B are reduced in case of strengthing the linearity degree. Then, by slightly adjusting parameters A and B, the guidance demand degree of a node recorded as the log in the table is calculated again. Parameters A and B are selected in case that the number of nodes each of which the adjustment result is the same as the correction contents in the table is maximum (S24). The server apparatus 100 stores the values of parameters A and B in the parameter memory 10 for each user.

In case of accessing from the client terminal 101, the server apparatus 100 receives a user ID of the client terminal 101. Accordingly, the server apparatus 100 can identify each user based on the user ID. The guidance demand degree calculation unit 3 reads out the parameters A and B of the user from the parameter memory 10, and executes the above-mentioned processing using the parameters A and B. Furthermore, as mentioned-above, the guidance demand degree adjustment unit 9 updates the parameters A and B of each user stored in the parameter memory 10.

As shown in S102 and S108 of FIG. 22, in response to a report of the present location from the user, the guidance information corresponding to the present location is presented at S103 and S109 in FIG. 22. Shortly thereafter, the present location of the user (client terminal) is automatically obtained by, for example, a GPS (Global Positioning Systems) or a PHS (Personal Handy-phone System), and informed to the server apparatus 100. In this case, as mentioned-above, the guidance information is presented in a dialogue node in response to the user's inquiry. In addition to this, by comparing the present location of the client terminal with the map information stored in the map information management unit 2, after the user's location on the route is determined, the guidance information corresponding to the user's location may be presented.

As mentioned-above, in the third embodiment, the interaction unit 8 presents the guidance information as dialogue format in response to the user's inquiry and the report of the present location. Based on the user's reply or inquiry for the presented guidance information, the guidance demand degree adjustment unit 9 updates parameters A and B of the user for controlling effect of the linearity degree, the complexity degree, and the change degree of route width in the guidance demand degree. As a result, a route for each user not to lose his way is selected, and accurate route guidance for each user is generated.

In the third embodiment, the server apparatus 100 presents the guidance information in response to a request from the client terminal 101. However, this component can be applied to a portable information communication terminal apparatus such as a notebook personal computer or a PDA. For example, in component of FIG. 21, a program describing the processing steps of each unit (the route selection unit 1, the map information management unit 2, the guidance demand degree calculation unit 3, the guidance generation unit 4, the interaction unit 8, the guidance demand degree adjustment unit 9) is executed by the information communication terminal apparatus in order to operate as the route guidance generation apparatus. In this case, the parameters A and B of the user of the information communication terminal apparatus is only stored in the parameter memory 10.

In a fourth embodiment, a map information editing support apparatus used for operation of the route guidance generation method is explained. The map information editing support apparatus 201 executes maintenance of map information for route selection and generation of accurate route guidance for the user not to lose his way. In the prior art, maintenance of map information is executed as local correction by periodical update of the map information and the user's grievance. In the former case, the map information is mainly updated by a through search by the map creation company, and requires time and cost. In the latter case, even if many users feel dissatisfaction with the map in case of finding error, they often do not complain of the map to the map creation company. Accordingly, many problems are not found and the same error repeatedly occurs. However, by using the guidance demand degree of the present invention, a point of which information is insufficient for guidance is estimated from many points on the map. Accordingly, time and cost for field survey can be reduced and lack of latent data can be independently improved.

Figure 25:
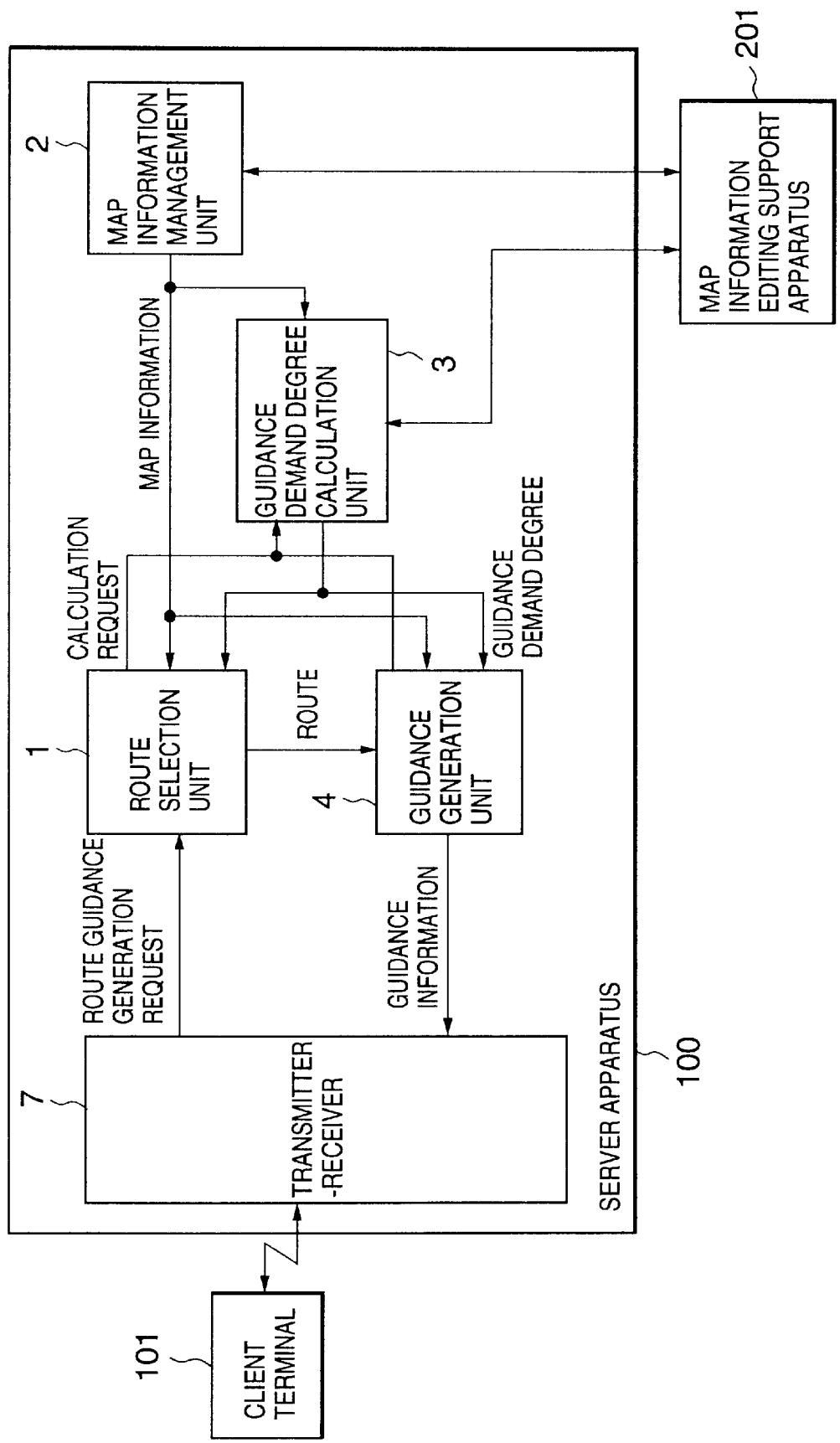
FIG. 25 is a block diagram of a route guidance generation apparatus according to a fourth embodiment of the present invention.

As shown in FIG. 25, the map information editing support apparatus 201 is connected to the server apparatus 100. The map information editing support apparatus 201 examines the map information stored in the map information management unit 2 and lists points having a high guidance demand degree. As a result, editing of the map information is supported by correcting an important point to improve ability of route guidance.

Figure 26:
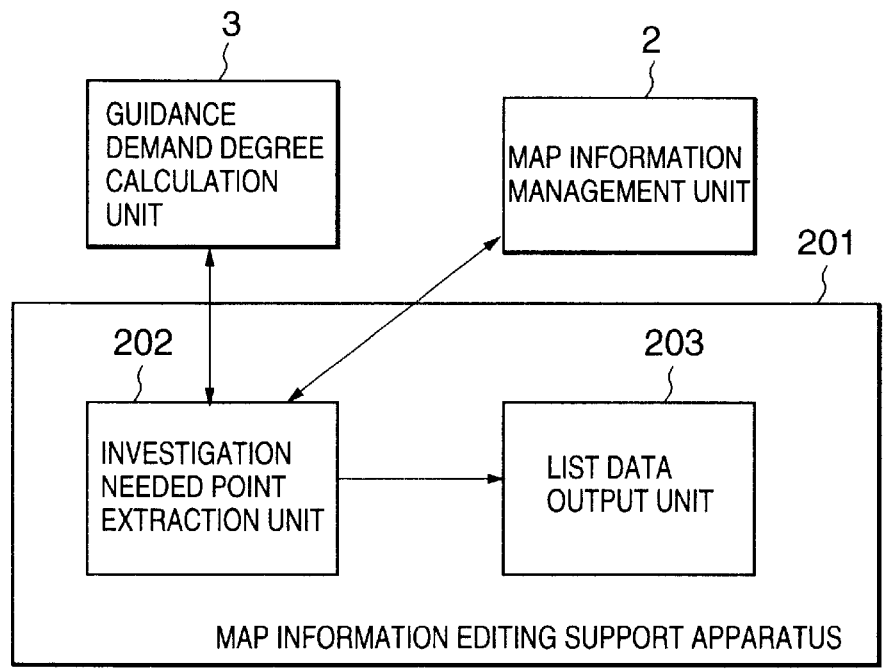
FIG. 26 is a block diagram of a map information editing support apparatus in FIG. 25.
Figure 27:
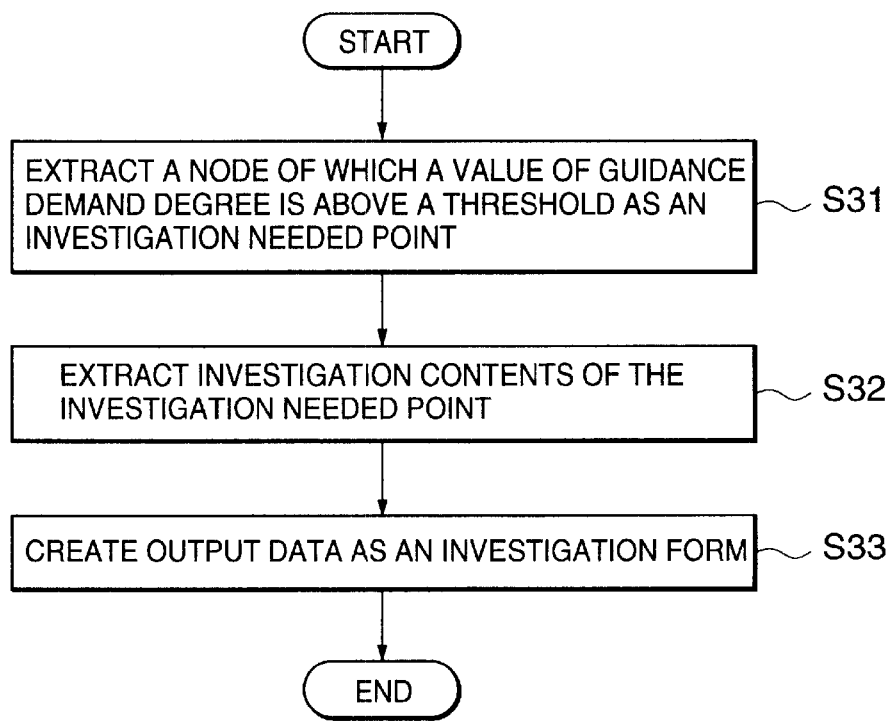
FIG. 27 is a flow chart of processing of the map information editing support apparatus according to the fourth embodiment of the present invention.

As shown in FIG. 26, the map information editing support apparatus 201 includes an investigation needed point extraction unit 202 and a list data output unit 203. Hereinafter, by referring to a flow chart shown in FIG. 27, processing of each unit of the map information editing support apparatus 201 is explained. For example, assume that the guidance demand degree calculation unit 3 stores the guidance demand degree of each node calculated in the past and the value of each calculation element used for calculating the guidance demand degree as a hysteresis curve. The investigation needed point extraction unit 202 reads out the guidance demand degree of each node as the hystersis from the guidance demand degree calculation unit 3, examines the map information stored in the map information management unit 2 in order, and lists the nodes having a guidance demand degree above a threshold. Furthermore, if the user indicates a specific area on the map, the guidance demand degree calculation unit 3 may calculate the guidance demand degree of all nodes in that area, and the investigation needed point extraction unit 202 may list the points having a guidance demand degree above a threshold from all the nodes (S31). Next, the investigation needed point extraction unit 202 extracts investigation contents of the point having a guidance demand degree above the threshold. As the investigation contents, by referring to the map information stored in the map information management unit 2, attribute data (For example, the number of landmarks) of route line neighboring the node decided as the investigation needed point are examined, and data insufficient for route guidance are extracted from the attribute data (S32). The list data output unit 203 lists places (nodes) having a high guidance demand degree and insufficient data necessary for route guidance as the investigation needed place for each area, and outputs list data specifying each investigation needed place and investigation contents for each area (S33). For example, the list data are printed on a predetermined form. By using an investigation sheet on which such list data are printed, investigation efficiency of investigator rises and maintenance operation of the map information is effectively executed.

Figure 28:
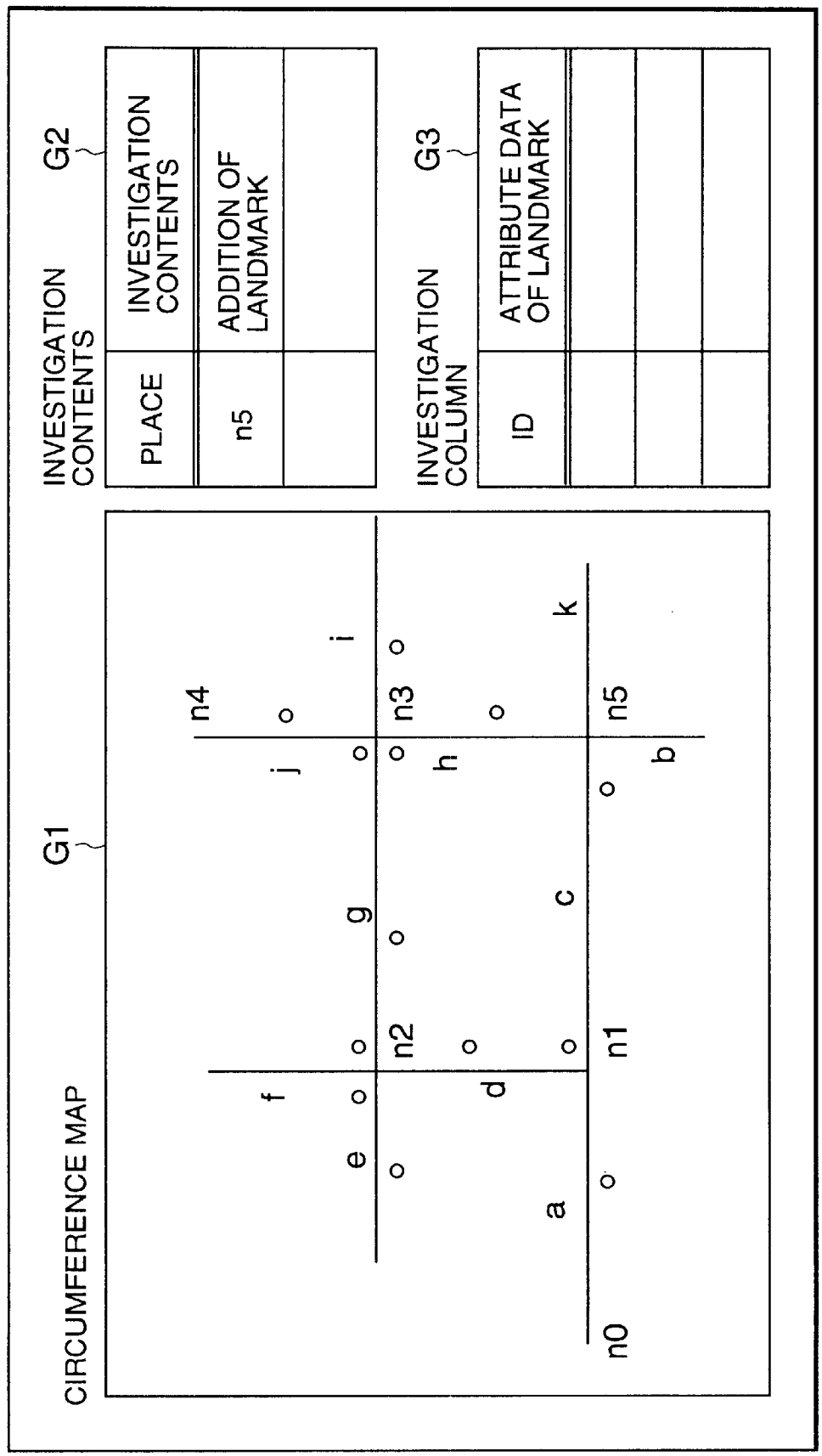
FIG. 28 is a schematic diagram of one example of an output list from the map information editing support apparatus.

FIG. 28 shows one example of an output from the list data output unit 203. As shown in FIG. 28, the investigation sheet printed out or a display of portable terminal is utilized by the investigator when he goes on an investigation. In FIG. 28, "CIRCUMFERENCE MAP" of area G1 represents a map of investigation area, "INVESTIGATION CONTENTS" of area G2 represents entry of the investigation needed place and the investigation contents, and "INVESTIGATION COLUMN" represents a column to enter the investigation result indicated as "INVESTIGATION CONTENTS". In FIG. 28, the landmark as signpost for route guidance does not exist near the node n5, and addition of landmark is mentioned as the investigation contents of the node n5. Accordingly, the investigator enters (or inputs) a location of landmark to be added with its ID on the circumference map displayed as the area G1, and enters (or inputs) attribute data (For example, name, type) of the landmark into the investigation column displayed as the area G3. Then, data entered on the investigation sheet or data input on the display are added to the map information stored in the map information management unit 2. Furthermore, as for a node of which calculation element used for calculation of the guidance demand degree is above a threshold, the investigation needed point extraction unit 202 may extract the route width or the junction point of route as the investigation contents, and may output list data for investigation as shown in FIG. 28.

Figure 29:
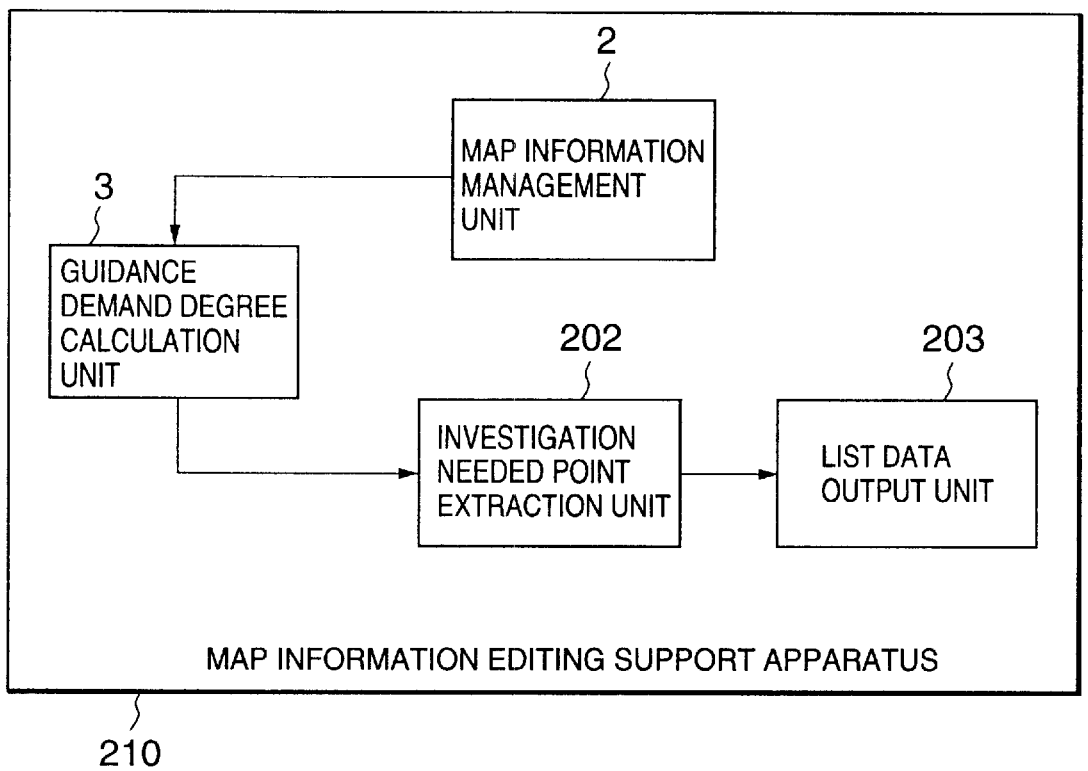
FIG. 29 is another block diagram of the map information editing support apparatus.

As shown in FIG. 29, the map information editing support apparatus 210 may include the above-mentioned functional components (the investigation needed point extraction unit 202, the list data output unit 203), the map information management unit 2, and the guidance demand degree calculation unit 3. In FIG. 29, for example, when the user indicates an area on the map, the guidance demand degree calculation unit 3 may calculate the guidance demand degree of all nodes in the area, and the investigation needed point extraction unit 202 may list up a node of which the guidance demand degree is above a threshold from the all nodes. Furthermore, function of the map information editing support apparatus 201 can be composed as a program executed by a computer.

As mentioned-above, in the fourth embodiment, a point of which data necessary for guidance are insufficient is extracted as an investigation needed point from points on the map having a high guidance demand degree. For example, by printing a list of the investigation needed points, an investigator can effectively execute a field investigation based on the list, and maintenance operation of the map information can be effected. In addition to this, by registering the maintained map information to the route guidance generation apparatus or the map information management unit 2 of the server apparatus shown in FIGS. 1, 20, and 21, ability of route selection and quality of generated guidance information raises.

Furthermore, in the prior art, in order to raise ability of route guidance, automatical analysis for improving which part of the map information is difficult. However, by using the guidance demand degree, the part to improve the map information can be selected, and improvement of ability and reduction of maintenance cost of the map information can be realized.

A memory can be used to store instructions for performing the process described above. Such a memory can be a CD-ROM, floppy dick, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A route guidance generation apparatus, comprising:
   an input unit configured to indicate a departure point and a destination point on map information;
   a calculation unit configured to extract a plurality of routes each connecting the departure point to the destination point from the map information, and to calculate a guidance demand degree for a plurality of guide points along each of the plurality of routes, the guidance demand degree reflecting an evaluation of the guide points based on linearity, complexity, and route width;
   a route selection unit configured to select one route from the plurality of routes based on the guidance demand degree of each route;
   a guidance generation unit configured to generate guidance information of each guide point along the selected route based on the guidance demand degree along the selected route; and
   a presentation unit configured to present the guidance information to a user.

2. The route guidance generation apparatus according to claim 1,
   further comprising a map information management unit configured to store the map information including a route network and landmark data, the route network including a plurality of nodes each arbitrarily located, each route line being connected between two nodes, and the landmark data including an attribute of each landmark used for guidance.

3. The route guidance generation apparatus according to claim 2,
   wherein said calculation unit selects a first node neighboring the departure point and a second node neighboring the destination point from the plurality of nodes, extracts the plurality of routes each consisting of a plurality of route lines connected from the first node to the second node, and searches at least one intermediate node along each of the plurality of routes from said map information management unit.

4. The route guidance generation apparatus according to claim 3,
   wherein said calculation unit recursively calculates a cost from a present node to the next node along each route, the cost including the guidance demand degree of the next node, a distance between the present node and the next node, and an existence degree of the landmark neighboring the next node, and calculates the sum of costs of all next nodes as the intermediate node along each route.

5. The route guidance generation apparatus according to claim 4,
   wherein said route selection unit selects a route having the minimum sum of costs from the plurality of routes.

6. The route guidance generation apparatus according to claim 1,
   wherein the linearity at a point is represented as a change angle between a first route line and a second route line along the route, and
   wherein the guidance demand degree for the linearity is high in proportion to the change angle.

7. The route guidance generation apparatus according to claim 6, wherein
   if a first branch line and a second branch line each not along the route cross at the point,
   the complexity at the point is represented as a junction angle between the second route line and the first branch line or the second branch line, and
   the guidance demand degree for the complexity is high in inverse proportion to the junction angle.

8. The route guidance generation apparatus according to claim 7, wherein
   if the first route line and the second route line are wider than the first branch line and the second branch line,
   the guidance demand degree for the route width is low.

9. The route guidance generation apparatus according to claim 8, wherein
   if the width of one of the first route line and the second route line is the same as the width of one of the first branch line and the second branch line,
   the guidance demand degree for the route width is high.

10. The route guidance generation apparatus according to claim 9, wherein
    in case of calculating the guidance demand degree at a point having a low degree of complexity,
    the guidance demand degree for the linearity is low.

11. The route guidance generation apparatus according to claim 10, wherein
    if the first route line and the second route line are wider than the first branch line and the second branch line,
    the guidance demand degree for the complexity and linearity are low.

12. The route guidance generation apparatus according to claim 5,
    wherein said guidance generation unit selects at least one node having a cost above a threshold from a plurality of intermediate nodes along the one route, and generates the guidance information of the selected node.

13. The route guidance generation apparatus according to claim 12,
    wherein the guidance information is one of a simplified map, a guidance sentence, a rally map, and a combination of the simplified map and the guidance sentence.

14. The route guidance generation apparatus according to claim 13,
wherein said guidance generation unit adds an explanation of feature of route as a principal reason of the guidance demand degree to the guidance information.

15. The route guidance generation apparatus according to 12,
wherein said guidance generation unit selects a presentation method of the guidance information based on the guidance demand degree of each selected node and the existence degree of the landmark neighboring each selected node, and
wherein said presentation unit proposes the presentation method to the user.

16. The route guidance generation apparatus according to claim 12, wherein
when said route selection unit cannot select a route, or decides that the route guidance is difficult based on the guidance demand degree of each selected node and the existence degree of the landmark neighboring each selected node,
said guidance generation unit generates a message representing that the route guidance is impossible instead of the guidance information.

17. The route guidance generation apparatus according to claim 1,
wherein said presentation unit interactively presents the guidance information of each guide point along the selected route in response to an inquiry from the user or a present location of the user.

18. The route guidance generation apparatus according to claim 17,
further comprising a guidance demand degree adjustment unit configured to detect the point of which the guidance demand degree is corrected based on an inquiry from the user, and to correct the user's parameter of at least one of the linearity, complexity, and route width based on the guidance demand degree of the detected point.

19. A computer program product, comprising:
a computer readable program code embodied in said product for causing a computer to generate guidance information, said computer readable program code having:

a first program code to indicate a departure point and a destination point on map information;

a second program code to extract a plurality of routes each connecting the departure point to the destination point from the map information;

a third program code to calculate a guidance demand degree for a plurality of guide points along each of the plurality of routes, the guidance demand degree reflecting an evaluation of the guide points based on linearity, complexity, and route width;

a fourth program code to select one route from the plurality of routes based on the guidance demand degree of each route;

a fifth program code to generate guidance information of each guide point along the selected route based on the guidance demand degree along the selected route; and a sixth program code to present the guidance information to a user.

20. A route guidance generation method, comprising:

indicating a departure point and a destination point on map information;

extracting a plurality of routes each connecting the departure point to the destination point from the map information;

calculating a guidance demand degree for a plurality of guide points along each of the plurality of routes, the guidance demand degree reflecting an evaluation of the guide points based on linearity, complexity, and route width;

selecting one route from the plurality of routes based on the guidance demand degree of each route;

generating guidance information of each guide point along the selected route based on the guidance demand degree along the selected route; and presenting the guidance information to a user.

* * * * *